US010986181B2

(12) United States Patent
Klose et al.

(10) Patent No.: US 10,986,181 B2
(45) Date of Patent: *Apr. 20, 2021

(54) CROSS-SYSTEM STORAGE MANAGEMENT FOR TRANSFERRING DATA ACROSS AUTONOMOUS INFORMATION MANAGEMENT SYSTEMS

(71) Applicant: Commvault Systems, Inc., Tinton Falls, NJ (US)

(72) Inventors: Michael F. Klose, San Jose, CA (US); Prasad Nara, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,980

(22) Filed: Nov. 13, 2019

(65) Prior Publication Data

US 2020/0084272 A1 Mar. 12, 2020

Related U.S. Application Data

(63) Continuation of application No. 16/184,032, filed on Nov. 8, 2018, now Pat. No. 10,523,752, which is a (Continued)

(51) Int. Cl.
*H04L 29/08* (2006.01)
*G06F 16/11* (2019.01)
*G06F 16/958* (2019.01)

(52) U.S. Cl.
CPC ........ *H04L 67/1095* (2013.01); *G06F 16/119* (2019.01); *G06F 16/972* (2019.01); *H04L 67/1097* (2013.01)

(58) Field of Classification Search
CPC ... G06F 11/1469; G06F 3/067; G06F 11/1458
See application file for complete search history.

(56) References Cited

U.S. PATENT DOCUMENTS

| 4,394,732 A | 7/1983 | Swenson |
| 4,464,122 A | 8/1984 | Fuller et al. |

(Continued)

FOREIGN PATENT DOCUMENTS

| EP | 0259912 | 3/1988 |
| EP | 0405926 A2 | 1/1991 |

(Continued)

OTHER PUBLICATIONS

"Multi Instancing," retrieved from http://documentation.commvault.com/hds/release_8_0_0/books_online_1/english_us/deployment/install/misc/multi_instancing.htm[Feb. 18, 2014 11:57:19 AM] on Feb. 18, 2014, 3 pages.

(Continued)

*Primary Examiner* — Shean Tokuta
(74) *Attorney, Agent, or Firm* — Commvault Systems, Inc.

(57) ABSTRACT

Systems and methods are disclosed for cross-system storage management for transferring data across autonomous information management systems. Data may be transferred from one information management system to another information management system without interfering with or overriding each system's autonomy. For example, a secondary copy of production data (e.g., backed up data) is transferred from a first information management system that originated the data to a component of another "foreign" information management system. A first storage manager that manages the first information management system also manages the cross-system data transfer operation to a "foreign" client computing device, which remains under autonomous management as a component of the foreign information management system.

20 Claims, 13 Drawing Sheets

Related U.S. Application Data continuation of application No. 15/680,031, filed on Aug. 17, 2017, now Pat. No. 10,205,780, which is a continuation of application No. 15/415,519, filed on Jan. 25, 2017, now Pat. No. 9,769,260, which is a continuation of application No. 14/198,517, filed on Mar. 5, 2014, now Pat. No. 9,648,100.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenly et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,384,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen et al. |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,872,905 A | 2/1999 | Ono et al. |
| 5,875,478 A | 2/1999 | Blumenau |
| 5,887,134 A | 3/1999 | Ebrahim |
| 5,894,585 A * | 4/1999 | Inoue ................ G06F 11/1451 710/7 |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,112,304 A | 8/2000 | Clawson |
| 6,131,095 A | 10/2000 | Low et al. |
| 6,131,190 A | 10/2000 | Sidwell |
| 6,148,412 A * | 11/2000 | Cannon ................ G06F 11/1464 714/6.31 |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsaio et al. |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 | 1/2002 | Sziklai et al. |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yani et al. |
| 6,519,679 B2 | 2/2003 | Devireddy et al. |
| 6,538,669 B1 | 3/2003 | Lagueux, Jr. et al. |
| 6,539,388 B1 | 3/2003 | Hattori et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,662,218 B2 | 12/2003 | Mighdoll et al. |
| 6,675,177 B1 | 1/2004 | Webb |
| 6,675,299 B2 | 1/2004 | Porter et al. |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |

(56) References Cited

U.S. PATENT DOCUMENTS

| | | | |
|---|---|---|---|
| 6,745,178 B1 | 6/2004 | Emens et al. | |
| 6,795,828 B2 | 9/2004 | Ricketts | |
| 6,816,941 B1 | 11/2004 | Carlson et al. | |
| 6,820,070 B2 | 11/2004 | Godlman et al. | |
| 6,839,741 B1 | 1/2005 | Tsai | |
| 6,839,803 B1 | 1/2005 | Loh et al. | |
| 6,850,994 B2 | 2/2005 | Gabryjelski | |
| 6,860,422 B2 | 3/2005 | Hull et al. | |
| 6,865,568 B2 | 3/2005 | Chau | |
| 6,871,182 B1 | 3/2005 | Winnard et al. | |
| 6,892,221 B2 | 5/2005 | Ricart et al. | |
| 6,898,650 B1 | 5/2005 | Gao et al. | |
| 6,948,038 B2 | 9/2005 | Berkowitz et al. | |
| 6,948,039 B2 | 9/2005 | Biessener et al. | |
| 6,957,186 B1 | 10/2005 | Guheen et al. | |
| 6,970,997 B2 | 11/2005 | Shibayama et al. | |
| 6,976,039 B2 | 12/2005 | Chefalas et al. | |
| 6,995,675 B2 | 2/2006 | Curkendall et al. | |
| 6,996,616 B1 | 2/2006 | Leighton et al. | |
| 7,003,641 B2 | 2/2006 | Prahlad et al. | |
| 7,028,079 B2 | 4/2006 | Mastrianni et al. | |
| 7,035,880 B1 | 4/2006 | Crescenti et al. | |
| 7,039,860 B1 | 5/2006 | Gautestad et al. | |
| 7,054,960 B1 | 5/2006 | Bezbaruah et al. | |
| 7,058,661 B2 | 6/2006 | Ciaramitaro et al. | |
| 7,099,901 B2 | 8/2006 | Sutoh et al. | |
| 7,107,298 B2 | 9/2006 | Prahlad et al. | |
| 7,107,416 B2 | 9/2006 | Stuart et al. | |
| 7,133,870 B1 | 11/2006 | Tripp et al. | |
| 7,139,826 B2 | 11/2006 | Watanabe et al. | |
| 7,139,846 B1 | 11/2006 | Rossi | |
| 7,146,387 B1 | 12/2006 | Russo et al. | |
| 7,155,421 B1 | 12/2006 | Haldar | |
| 7,155,481 B2 | 12/2006 | Prahlad et al. | |
| 7,159,081 B2 | 1/2007 | Suzuki | |
| 7,171,468 B2 | 1/2007 | Yeung et al. | |
| 7,171,585 B2 | 1/2007 | Gail et al. | |
| 7,185,152 B2 | 2/2007 | Takahashi et al. | |
| 7,188,141 B2 | 3/2007 | Novaes | |
| 7,240,100 B1 | 7/2007 | Wein et al. | |
| 7,246,207 B2 | 7/2007 | Kottomtharayil et al. | |
| 7,269,664 B2 | 9/2007 | Hutsch et al. | |
| 7,284,033 B2 | 10/2007 | Jhanjji | |
| 7,287,047 B2 | 10/2007 | Kavuri | |
| 7,290,017 B1 | 10/2007 | Wang et al. | |
| 7,313,659 B2 | 12/2007 | Suzuki | |
| 7,315,923 B2 | 1/2008 | Retnamma et al. | |
| 7,328,325 B1 | 2/2008 | Solis et al. | |
| 7,343,453 B2 | 3/2008 | Prahlad et al. | |
| 7,346,623 B2 | 3/2008 | Prahlad et al. | |
| 7,346,676 B1 | 3/2008 | Swildens et al. | |
| 7,346,751 B2 | 3/2008 | Prahlad et al. | |
| 7,376,947 B2 | 5/2008 | Evers | |
| 7,379,978 B2 | 5/2008 | Anderson et al. | |
| 7,383,379 B2 | 6/2008 | Patterson et al. | |
| 7,386,535 B1 | 6/2008 | Kalucha et al. | |
| 7,395,282 B1 | 7/2008 | Crescenti et al. | |
| 7,421,460 B2 | 9/2008 | Chigusa et al. | |
| 7,424,543 B2 | 9/2008 | Rice, III | |
| 7,343,219 B2 | 10/2008 | De Meno et al. | |
| 7,457,790 B2 | 11/2008 | Kochunni et al. | |
| 7,472,142 B2 | 12/2008 | Prahlad et al. | |
| 7,496,841 B2 | 2/2009 | Hadfield et al. | |
| 7,529,782 B2 | 5/2009 | Prahlad et al. | |
| 7,536,291 B1* | 5/2009 | Vijayan Retnamma | G06F 3/0619 |
| | | | 703/21 |
| 7,543,125 B2 | 6/2009 | Gokhale | |
| 7,565,484 B2 | 7/2009 | Ghosal et al. | |
| 7,577,689 B1 | 8/2009 | Masinter et al. | |
| 7,577,694 B2 | 8/2009 | Nakano et al. | |
| 7,581,077 B2* | 8/2009 | Ignatius | G06F 3/0613 |
| | | | 711/154 |
| 7,584,469 B2 | 9/2009 | Mitekura et al. | |
| 7,587,715 B1 | 9/2009 | Barrett et al. | |
| 7,593,935 B2 | 9/2009 | Sullivan | |
| 7,596,713 B2 | 9/2009 | Mani-Meitav et al. | |
| 7,603,626 B2 | 10/2009 | Williams et al. | |
| 7,606,844 B2 | 10/2009 | Kottomtharayil | |
| 7,610,285 B1 | 10/2009 | Zoellner et al. | |
| 7,617,262 B2 | 11/2009 | Prahlad et al. | |
| 7,656,849 B1* | 2/2010 | Evans | H04W 76/14 |
| | | | 370/338 |
| 7,668,884 B2 | 2/2010 | Prahlad et al. | |
| 7,673,175 B2 | 3/2010 | Mora et al. | |
| 7,676,542 B2 | 3/2010 | Moser et al. | |
| 7,689,899 B2 | 3/2010 | Leymaster et al. | |
| 7,698,520 B2 | 4/2010 | Minami et al. | |
| 7,730,031 B2 | 6/2010 | Forster | |
| 7,734,593 B2 | 6/2010 | Prahlad et al. | |
| 7,734,669 B2 | 6/2010 | Kottomtharayil et al. | |
| 7,747,579 B2 | 6/2010 | Prahlad et al. | |
| 7,751,628 B1 | 7/2010 | Reisman | |
| 7,761,409 B2 | 7/2010 | Stefik et al. | |
| 7,792,789 B2 | 9/2010 | Prahlad et al. | |
| 7,801,871 B2 | 9/2010 | Gosnell | |
| 7,814,118 B2 | 10/2010 | Kottomtharayil et al. | |
| 7,827,266 B2 | 11/2010 | Gupta | |
| 7,831,793 B2 | 11/2010 | Chakravarty et al. | |
| 7,840,537 B2 | 11/2010 | Gokhale et al. | |
| 7,844,676 B2 | 11/2010 | Prahlad et al. | |
| 7,865,517 B2 | 1/2011 | Prahlad et al. | |
| 7,882,077 B2 | 2/2011 | Gokhale et al. | |
| 7,882,093 B2 | 2/2011 | Kottomtharayil et al. | |
| 7,882,097 B1 | 2/2011 | Ogilvie | |
| 7,937,393 B2 | 5/2011 | Prahlad et al. | |
| 7,937,420 B2 | 5/2011 | Tabellion et al. | |
| 7,937,702 B2 | 5/2011 | De Meno et al. | |
| 7,984,063 B2 | 7/2011 | Kottomtharayil et al. | |
| 7,984,435 B2* | 7/2011 | Kokkinen | G06F 8/658 |
| | | | 717/170 |
| 8,037,028 B2 | 10/2011 | Prahlad et al. | |
| 8,055,627 B2 | 11/2011 | Prahlad et al. | |
| 8,060,514 B2 | 11/2011 | Arrouye et al. | |
| 8,078,607 B2 | 12/2011 | Oztekin et al. | |
| 8,099,428 B2 | 1/2012 | Kottomtharayil et al. | |
| 8,108,427 B2 | 1/2012 | Prahlad et al. | |
| 8,126,854 B1 | 2/2012 | Sreedharan | |
| 8,131,784 B1 | 3/2012 | Zhuge et al. | |
| 8,140,786 B2 | 3/2012 | Bunte et al. | |
| 8,145,742 B1 | 3/2012 | Parker et al. | |
| 8,156,086 B2 | 4/2012 | Lu et al. | |
| 8,161,003 B2 | 4/2012 | Kavuri | |
| 8,170,995 B2 | 5/2012 | Prahlad et al. | |
| 8,200,638 B1 | 6/2012 | Zheng et al. | |
| 8,219,524 B2 | 7/2012 | Gokhale | |
| 8,229,954 B2 | 7/2012 | Kottomtharayil et al. | |
| 8,230,054 B2 | 7/2012 | Mutnuru et al. | |
| 8,230,195 B2 | 7/2012 | Amarendran et al. | |
| RE43,678 E | 9/2012 | Major et al. | |
| 8,274,803 B2 | 9/2012 | Swamy et al. | |
| 8,285,681 B2 | 9/2012 | Prahlad et al. | |
| 8,307,177 B2 | 11/2012 | Prahlad et al. | |
| 8,347,088 B2 | 1/2013 | Moore et al. | |
| 8,348,827 B2 | 1/2013 | Zwolinski | |
| 8,352,954 B2 | 1/2013 | Gokhale et al. | |
| 8,364,652 B2 | 1/2013 | Vijayan et al. | |
| 8,370,166 B2 | 2/2013 | Ronnewinkel | |
| 8,396,838 B2 | 3/2013 | Brockway et al. | |
| 8,468,538 B2 | 6/2013 | Attarde et al. | |
| 8,473,585 B1* | 6/2013 | Smith | H04L 67/1097 |
| | | | 709/219 |
| 8,477,618 B2 | 7/2013 | Martin | |
| 8,495,331 B2* | 7/2013 | Matsumoto | G06F 3/0608 |
| | | | 711/170 |
| 8,505,010 B2 | 8/2013 | De Meno et al. | |
| 8,510,573 B2 | 8/2013 | Muller et al. | |
| 8,578,120 B2 | 11/2013 | Attarde et al. | |
| 8,612,394 B2 | 12/2013 | Prahlad et al. | |
| 8,655,850 B2 | 2/2014 | Ngo et al. | |
| 8,706,867 B2* | 4/2014 | Vijayan | H04L 12/2803 |
| | | | 709/224 |
| 8,707,070 B2* | 4/2014 | Muller | G06F 1/3221 |
| | | | 713/320 |

(56) References Cited

U.S. PATENT DOCUMENTS

| | | | |
|---|---|---|---|
| 8,719,264 B2* | 5/2014 | Varadharajan | G06F 16/185 707/736 |
| 8,719,767 B2* | 5/2014 | Bansod | G06F 8/71 717/101 |
| 8,719,809 B2* | 5/2014 | Gokhale | G06F 11/1433 717/170 |
| 8,725,688 B2* | 5/2014 | Lad | G06F 16/128 707/639 |
| 8,769,048 B2* | 7/2014 | Kottomtharayil | G06F 11/1461 709/219 |
| 8,775,823 B2 | 7/2014 | Gokhale et al. | |
| 8,782,064 B2 | 7/2014 | Kottomtharayil et al. | |
| 8,826,284 B1 | 9/2014 | Fuller | |
| 8,832,706 B2 | 9/2014 | Gokhale et al. | |
| 8,849,762 B2* | 9/2014 | Kumarasamy | H04L 67/1097 707/646 |
| 8,959,299 B2 | 2/2015 | Ngo et al. | |
| 8,966,288 B2* | 2/2015 | Ignatius | G06F 21/602 713/193 |
| 9,015,181 B2* | 4/2015 | Kottomtharayil | G06F 11/1453 707/758 |
| 9,092,378 B2 | 7/2015 | Kumarasamy et al. | |
| 9,098,495 B2* | 8/2015 | Gokhale | G06F 16/1748 |
| 9,111,220 B2* | 8/2015 | Prahlad | G06F 3/0686 |
| 9,122,692 B1 | 9/2015 | Dalal et al. | |
| 9,128,883 B2 | 9/2015 | Gokhale et al. | |
| 9,223,597 B2* | 12/2015 | Deshpande | G06F 9/45533 |
| 9,244,779 B2* | 1/2016 | Littlefield | G06F 3/0641 |
| 9,262,226 B2 | 2/2016 | Gokhale et al. | |
| 9,262,496 B2* | 2/2016 | Kumarasamy | G06F 16/122 |
| 9,356,209 B2 | 5/2016 | Seo et al. | |
| 9,444,811 B2 | 9/2016 | Nara et al. | |
| 9,459,968 B2 | 10/2016 | Vijayan | |
| 9,648,100 B2 | 5/2017 | Klose et al. | |
| 9,769,260 B2 | 9/2017 | Klose et al. | |
| 10,205,780 B2 | 2/2019 | Klose et al. | |
| 10,523,752 B2 | 12/2019 | Klose et al. | |
| 2002/0032878 A1 | 3/2002 | Karpf | |
| 2002/0049883 A1 | 4/2002 | Schneider et al. | |
| 2003/0028592 A1 | 2/2003 | Ooho et al. | |
| 2003/0028622 A1* | 2/2003 | Inoue | H04L 63/10 709/219 |
| 2003/0046313 A1 | 3/2003 | Leung et al. | |
| 2003/0050979 A1 | 3/2003 | Takahashi | |
| 2003/0101086 A1 | 5/2003 | San Miguel | |
| 2004/0039689 A1 | 2/2004 | Penney et al. | |
| 2004/0068713 A1 | 4/2004 | Yannakoyorgos et al. | |
| 2004/0098383 A1 | 5/2004 | Tabellion et al. | |
| 2004/0267815 A1 | 12/2004 | De Mes | |
| 2005/0039069 A1 | 2/2005 | Prahlad et al. | |
| 2005/0097070 A1 | 5/2005 | Enis et al. | |
| 2005/0216788 A1 | 9/2005 | Mani-Meitav et al. | |
| 2005/0246510 A1 | 11/2005 | Retnamma et al. | |
| 2005/0251786 A1 | 11/2005 | Citron et al. | |
| 2006/0036619 A1 | 2/2006 | Fuerst et al. | |
| 2006/0047830 A1* | 3/2006 | Nair | H04L 63/08 709/229 |
| 2006/0053261 A1* | 3/2006 | Prahlad | G06F 11/1446 711/162 |
| 2006/0070061 A1 | 3/2006 | Cox et al. | |
| 2006/0110286 A1 | 5/2006 | Boukas | |
| 2006/0115802 A1 | 6/2006 | Reynolds | |
| 2006/0116999 A1 | 6/2006 | Dettinger et al. | |
| 2006/0149604 A1 | 7/2006 | Miller | |
| 2006/0149724 A1 | 7/2006 | Ritter et al. | |
| 2006/0177114 A1 | 8/2006 | Tongdee et al. | |
| 2006/0195678 A1 | 8/2006 | Jalobeanu | |
| 2006/0195838 A1 | 8/2006 | Epstein | |
| 2006/0224846 A1* | 10/2006 | Amarendran | G06F 3/0604 711/162 |
| 2006/0224852 A1 | 10/2006 | Kottomtharayil et al. | |
| 2006/0265396 A1 | 11/2006 | Raman et al. | |
| 2006/0271935 A1 | 11/2006 | Cox et al. | |
| 2006/0282900 A1 | 12/2006 | Johnson et al. | |
| 2007/0014347 A1 | 1/2007 | Prechtl et al. | |
| 2007/0022122 A1 | 1/2007 | Bahar et al. | |
| 2007/0022145 A1 | 1/2007 | Kavuri | |
| 2007/0028229 A1 | 2/2007 | Knatcher | |
| 2007/0043715 A1 | 2/2007 | Kaushik et al. | |
| 2007/0061298 A1 | 3/2007 | Wilson et al. | |
| 2007/0136541 A1 | 6/2007 | Herz et al. | |
| 2007/0143497 A1* | 6/2007 | Kottomtharayil | G06F 16/10 709/238 |
| 2007/0156783 A1 | 7/2007 | Zbogar-Smith et al. | |
| 2007/0166674 A1 | 7/2007 | Kochunni et al. | |
| 2007/0174246 A1 | 7/2007 | Sigurdsson et al. | |
| 2007/0185915 A1 | 8/2007 | Prahlad et al. | |
| 2007/0198797 A1* | 8/2007 | Kavuri | G06F 3/0653 711/165 |
| 2007/0208788 A1 | 9/2007 | Chakravarty et al. | |
| 2007/0226320 A1 | 9/2007 | Hager et al. | |
| 2007/0226535 A1* | 9/2007 | Gokhale | G06F 11/1464 714/6.12 |
| 2007/0250810 A1 | 10/2007 | Tittizer et al. | |
| 2007/0296258 A1 | 12/2007 | Calvert et al. | |
| 2008/0022003 A1 | 1/2008 | Alve | |
| 2008/0028009 A1* | 1/2008 | Ngo | G06F 16/178 |
| 2008/0033903 A1 | 2/2008 | Carol et al. | |
| 2008/0126302 A1 | 5/2008 | Mora et al. | |
| 2008/0263565 A1 | 10/2008 | Luther et al. | |
| 2008/0282048 A1 | 11/2008 | Miura | |
| 2008/0288947 A1 | 11/2008 | Gokhale et al. | |
| 2009/0063765 A1* | 3/2009 | Kottomtharayil | G06F 3/0686 711/112 |
| 2009/0171883 A1 | 7/2009 | Kochunni et al. | |
| 2009/0187908 A1 | 7/2009 | He et al. | |
| 2009/0228531 A1 | 9/2009 | Baumann et al. | |
| 2009/0319534 A1 | 12/2009 | Gokhale | |
| 2009/0320029 A1 | 12/2009 | Kottomtharayil | |
| 2009/0320033 A1 | 12/2009 | Gokhale et al. | |
| 2010/0005259 A1 | 1/2010 | Prahlad et al. | |
| 2010/0031017 A1 | 2/2010 | Gokhale et al. | |
| 2010/0036772 A1 | 2/2010 | Arceneaux | |
| 2010/0070466 A1* | 3/2010 | Prahlad | G06F 3/0649 707/609 |
| 2010/0070474 A1 | 3/2010 | Lad | |
| 2010/0070726 A1 | 3/2010 | Ngo et al. | |
| 2010/0076932 A1 | 3/2010 | Lad | |
| 2010/0114837 A1 | 5/2010 | Prahlad et al. | |
| 2010/0125477 A1 | 5/2010 | Mousseau et al. | |
| 2010/0161773 A1* | 6/2010 | Prahlad | G06F 9/44505 709/221 |
| 2010/0172301 A1* | 7/2010 | Watfa | H04W 36/0022 370/328 |
| 2010/0180332 A1 | 7/2010 | Ben-Yochanan et al. | |
| 2010/0205582 A1 | 8/2010 | Liu | |
| 2010/0250549 A1* | 9/2010 | Muller | G06F 16/27 707/741 |
| 2010/0262911 A1 | 10/2010 | Kaplan et al. | |
| 2010/0299490 A1* | 11/2010 | Attarde | G06F 11/1453 711/162 |
| 2010/0306283 A1 | 12/2010 | Johnson et al. | |
| 2010/0306643 A1 | 12/2010 | Chabot et al. | |
| 2010/0332401 A1 | 12/2010 | Prahlad et al. | |
| 2010/0332456 A1* | 12/2010 | Prahlad | H04L 67/2852 707/664 |
| 2011/0016091 A1 | 1/2011 | Prahlad et al. | |
| 2011/0069179 A1 | 3/2011 | Bathiche et al. | |
| 2011/0161299 A1 | 6/2011 | Prahlad et al. | |
| 2011/0231362 A1* | 9/2011 | Attarde | G06F 11/3442 707/609 |
| 2011/0295804 A1* | 12/2011 | Erofeev | G06F 11/1435 707/634 |
| 2011/0302141 A1 | 12/2011 | Nadathur et al. | |
| 2012/0011515 A1 | 1/2012 | Jolfaei et al. | |
| 2012/0066633 A1* | 3/2012 | Saito | G06F 11/34 715/772 |
| 2012/0084524 A1* | 4/2012 | Gokhale | G06F 11/1451 711/162 |
| 2012/0084782 A1* | 4/2012 | Chou | G06F 11/2097 718/102 |

(56) References Cited

U.S. PATENT DOCUMENTS

| | | | |
|---|---|---|---|
| 2012/0094674 A1* | 4/2012 | Wu | H04W 36/0058 455/437 |
| 2012/0150818 A1 | 6/2012 | Vijayan Retnamma et al. | |
| 2012/0150826 A1 | 6/2012 | Vijayan Retnamma et al. | |
| 2012/0203742 A1* | 8/2012 | Goodman | G06F 16/122 707/646 |
| 2012/0254116 A1 | 10/2012 | Thereska et al. | |
| 2012/0254119 A1 | 10/2012 | Kumarasamy et al. | |
| 2012/0254824 A1 | 10/2012 | Bansod | |
| 2012/0263191 A1 | 10/2012 | Baron | |
| 2012/0265754 A1 | 10/2012 | Kottomtharayil et al. | |
| 2012/0272205 A1 | 10/2012 | Fox et al. | |
| 2012/0275598 A1 | 11/2012 | Vimpari et al. | |
| 2012/0317085 A1 | 12/2012 | Green et al. | |
| 2013/0006625 A1 | 1/2013 | Gunatilake et al. | |
| 2013/0007710 A1 | 1/2013 | Vedula et al. | |
| 2013/0024429 A1 | 1/2013 | Raas | |
| 2013/0024568 A1 | 1/2013 | Popczynski et al. | |
| 2013/0046817 A1* | 2/2013 | Isbister | H04L 67/06 709/203 |
| 2013/0104027 A1 | 4/2013 | Bennett et al. | |
| 2013/0110854 A1 | 5/2013 | Lockhart et al. | |
| 2013/0136253 A1 | 5/2013 | Liberman Ben-Ami et al. | |
| 2013/0145376 A1 | 6/2013 | Gokhale et al. | |
| 2013/0219458 A1 | 8/2013 | Ramanathan | |
| 2013/0232184 A1 | 9/2013 | Grube et al. | |
| 2013/0238562 A1* | 9/2013 | Kumarasamy | G06F 9/45558 707/649 |
| 2013/0238969 A1 | 9/2013 | Smith et al. | |
| 2013/0262385 A1* | 10/2013 | Kumarasamy | G06F 16/27 707/634 |
| 2013/0262387 A1 | 10/2013 | Varadharajan et al. | |
| 2013/0262390 A1* | 10/2013 | Kumarasamy | H04L 67/2804 707/649 |
| 2013/0262396 A1* | 10/2013 | Kripalani | G06F 11/1464 707/674 |
| 2013/0262410 A1 | 10/2013 | Liu et al. | |
| 2013/0262615 A1* | 10/2013 | Ankireddypalle | G06F 3/0604 709/213 |
| 2013/0262706 A1 | 10/2013 | Stadlberg et al. | |
| 2013/0282662 A1* | 10/2013 | Kumarasamy | G06F 3/0619 707/649 |
| 2013/0326159 A1* | 12/2013 | Vijayan | G06F 3/0605 711/148 |
| 2013/0332412 A1* | 12/2013 | Amarendran | G06F 16/113 707/610 |
| 2014/0025641 A1* | 1/2014 | Kumarasamy | G06F 16/27 707/661 |
| 2014/0025796 A1* | 1/2014 | Vibhor | H04L 41/12 709/222 |
| 2014/0026000 A1* | 1/2014 | Ma | H04L 69/40 714/47.1 |
| 2014/0040210 A1 | 2/2014 | Avery et al. | |
| 2014/0040580 A1* | 2/2014 | Kripalani | G06F 3/0619 711/162 |
| 2014/0046900 A1* | 2/2014 | Kumarasamy | G06F 11/1489 707/620 |
| 2014/0046904 A1* | 2/2014 | Kumarasamy | G06F 16/113 707/652 |
| 2014/0086127 A1* | 3/2014 | Kim | H04L 5/001 370/311 |
| 2014/0108351 A1* | 4/2014 | Nallathambi | G06F 11/1464 707/639 |
| 2014/0108355 A1 | 4/2014 | Prahlad et al. | |
| 2014/0108470 A1 | 4/2014 | Lad | |
| 2014/0180664 A1* | 6/2014 | Kochunni | G06F 11/3442 703/21 |
| 2014/0181032 A1* | 6/2014 | Kumarasamy | G06F 16/178 707/640 |
| 2014/0181037 A1* | 6/2014 | Pawar | G06F 16/1865 707/648 |
| 2014/0181045 A1* | 6/2014 | Pawar | G06F 11/1458 707/654 |
| 2014/0181085 A1* | 6/2014 | Gokhale | G06F 16/168 707/722 |
| 2014/0181443 A1* | 6/2014 | Kottomtharayil | G06F 3/0649 711/162 |
| 2014/0188804 A1 | 7/2014 | Gokhale et al. | |
| 2014/0188805 A1* | 7/2014 | Vijayan | G06F 16/1752 707/646 |
| 2014/0188812 A1* | 7/2014 | Vijayan | G06F 11/1469 707/679 |
| 2014/0189432 A1* | 7/2014 | Gokhale | G06F 11/1469 714/41 |
| 2014/0201140 A1 | 7/2014 | Vibhor et al. | |
| 2014/0201142 A1* | 7/2014 | Varadharajan | G06F 3/067 707/622 |
| 2014/0201144 A1* | 7/2014 | Vibhor | H04L 67/18 707/634 |
| 2014/0201150 A1* | 7/2014 | Kumarasamy | G06F 11/1402 707/639 |
| 2014/0201154 A1* | 7/2014 | Varadharajan | G06F 11/1456 707/647 |
| 2014/0201155 A1* | 7/2014 | Vijayan | G06F 11/1448 707/647 |
| 2014/0201161 A1* | 7/2014 | Kumarasamy | G06F 11/1469 707/679 |
| 2014/0201162 A1* | 7/2014 | Kumarasamy | G06F 11/1469 707/679 |
| 2014/0201171 A1* | 7/2014 | Vijayan | G06F 11/1453 707/692 |
| 2014/0250076 A1 | 9/2014 | Lad | |
| 2014/0258236 A1* | 9/2014 | Vijayan | G06F 16/116 707/639 |
| 2014/0279922 A1 | 9/2014 | Kottomtharayil | |
| 2014/0281214 A1 | 9/2014 | Rehm et al. | |
| 2014/0365443 A1 | 12/2014 | Goel et al. | |
| 2015/0081948 A1 | 3/2015 | Thereska et al. | |
| 2015/0089211 A1* | 3/2015 | Karandikar | H04L 67/34 713/100 |
| 2015/0193150 A1* | 7/2015 | Kura | G06F 3/0607 711/170 |
| 2015/0193229 A1 | 7/2015 | Bansod | |
| 2015/0227355 A1 | 8/2015 | Tripoli et al. | |
| 2015/0234879 A1 | 8/2015 | Baldwin et al. | |
| 2015/0244775 A1 | 8/2015 | Vibhor et al. | |
| 2015/0256617 A1* | 9/2015 | Klose | G06F 16/972 709/217 |
| 2015/0278024 A1 | 10/2015 | Barman et al. | |
| 2015/0301903 A1 | 10/2015 | Mutha et al. | |
| 2015/0324226 A1 | 11/2015 | Gokhale et al. | |
| 2015/0324233 A1 | 11/2015 | Gokhale et al. | |
| 2015/0324255 A1 | 11/2015 | Kochunni et al. | |
| 2015/0331899 A1 | 11/2015 | Gokhale et al. | |
| 2015/0347238 A1 | 12/2015 | Kumarasamy et al. | |
| 2016/0110266 A1 | 4/2016 | Nara et al. | |
| 2016/0224384 A1 | 8/2016 | Gokhale et al. | |
| 2016/0350029 A1 | 12/2016 | Nara et al. | |
| 2018/0013825 A1* | 1/2018 | Klose | G06F 16/972 |
| 2019/0075161 A1 | 3/2019 | Klose et al. | |

FOREIGN PATENT DOCUMENTS

| | | |
|---|---|---|
| EP | 0467546 A2 | 1/1992 |
| EP | 0774715 | 5/1997 |
| EP | 0809184 | 11/1997 |
| EP | 0899662 A1 | 3/1999 |
| EP | 0910019 A2 | 4/1999 |
| EP | 0981090 | 2/2000 |
| EP | 0986011 | 3/2000 |
| EP | 1035690 | 9/2000 |
| GB | 2216368 A | 10/1989 |
| JP | 07-046271 A | 2/1995 |
| JP | 8044598 A | 2/1996 |
| JP | 2000-035969 | 2/2000 |
| JP | 2003-531435 | 10/2003 |
| WO | WO 95/13580 | 5/1995 |
| WO | WO 99/12098 | 3/1999 |
| WO | WO 00/58865 | 10/2000 |
| WO | WO 01/06368 | 1/2001 |

(56) References Cited

FOREIGN PATENT DOCUMENTS

| WO | WO 01/16693 | 3/2001 | |
|---|---|---|---|
| WO | WO 01/80005 | 10/2001 | |
| WO | WO 2010057199 A2 | 5/2010 | |
| WO | WO-2010057199 A2 * | 5/2010 | ........... H04L 9/0833 |

OTHER PUBLICATIONS

Armstead et al., "Implementation of a Campwide Distributed Mass Storage Service: The Dream vs. Reality,"IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40$^{th}$ IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, Jun. 12-16, 1994 pp. 124-126.

Gait, J., "The Optical File Cabinet: A Random-Access File System for Write-Once Optical Disks," IEEE Computer, vol. 21, No. 6, pp. 11-22 (Jun. 1988).

Hennessy et al., "Computer Architecture—A Quantitative Approach", 2$^{nd}$ Edition, 1996, pp. 246-250.

Hutchinson, Norman C., et al. "Logical vs. Physical File System Backup." OSDI. vol. 99. 1999, 12 pages.

Jander, M., "Launching Storage-Area Net," Data Communications, US, McGraw Hill, NY, vol. 27, No. 4 (Mar. 21, 1998), pp. 64-72.

Matthews, Jeanna, et al. "Data Protection and Rapid Recovery From Attach with a Virtual Private File Server and Virtual Machine Appliances." Proceedings of the IASTED International Conference on Communication, Network and Information Security (CNIS 2005). 2005, 14 pages.

Microsoft Press Computer Dictionary Third Edition, "Data Compression," Microsoft Press, 1997, p. 130.

Pitoura et al., "Locating Objects in Mobile Computing", IEEE Transactions on Knowledge and Data Engineering, vol. 13, No. 4, Jul./Aug. 2001, pp. 571-592.

Quinlan, Sean. "A cached worm file system." Software: Practice and Experience 21.12 (1991): 1289-1299.

Rosenblum et al., "The Design and Implementation of a Long-Structure File System," Operating Systems Review SIGOPS, vol. 25, No. 5, New York, US, pp. 1-15 (May 1991).

Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.

Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.

Wu, Chin-Hsien, Tei-Wei Kuo, and Li-Pin Chang. "Efficient initialization and crash recovery for log-based file systems over flash memory." Proceedings of the 2006 ACM symposium on Applied Computing. ACM, 2006, 5 pages.

Hsiao, David K., "Federated databases and systems: part i-a tutorial on tehri data sharing." The VLDB Journal 1.1 (1992): 127-179.

Pollack, et al., "Quota enforcement for high-performance distributed storage systems," 24$^{th}$ IEEE Conference on Mass Storage Systems and Technologies (MSST 2007), Sep. 24-27, 2007, pp. 72-86.

Prigge, "Review: ExaGrid aces disk-to-disk backup," Jan. 3, 2013, InfoWorld, 12 pages.

Extended European Search Report for Applicant No. EP 09767119, dated Feb. 11, 2013, 12 pages.

PCT International Search Report for International Application No. PCT/US09/32325, dated Mar. 17, 2009, 11 pages.

\* cited by examiner

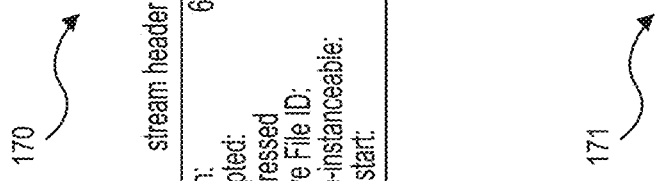

CROSS-SYSTEM STORAGE MANAGEMENT FOR TRANSFERRING DATA ACROSS AUTONOMOUS INFORMATION MANAGEMENT SYSTEMS

INCORPORATION BY REFERENCE TO ANY PRIORITY APPLICATIONS

This application is a Continuation of U.S. patent application Ser. No. 16/184,032 filed on Nov. 8, 2018, which is a Continuation of U.S. patent application Ser. No. 15/680,031 filed on Aug. 17, 2017 (now U.S. Pat. No. 10,205,780), which is a Continuation of U.S. patent application Ser. No. 15/415,519 (now U.S. Pat. No. 9,769,260) filed on Jan. 25, 2017, which is a Continuation of U.S. patent application Ser. No. 14/198,517 (now U.S. Pat. No. 9,648,100) filed on Mar. 5, 2014. Any and all applications for which a foreign and/or domestic priority claim is identified in the Application Data Sheet of the present application are hereby incorporated by reference under 37 CFR 1.57 in their entireties.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc. Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

BRIEF DESCRIPTION OF THE DRAWINGS

FIGS. 1F-1H are block diagrams illustrating suitable data structures that may be employed by the information management system.

DETAILED DESCRIPTION

Systems and methods are disclosed for cross-system storage management for transferring data across autonomous information management systems. Data may be transferred from one information management system to another information management system such that the autonomy of each system is respected. For example, a secondary copy of production data (e.g., backed up data) is transferred from secondary storage in a first information management system, which originated the data, to a component of another ("foreign") information management system, e.g., a foreign client. A first storage manager that manages the first information management system also manages the cross-system data transfer operation to the foreign component. The first storage manager is provided with a minimum of information about the foreign component, enough to allow for the data transfer thereto, but not enough to actively manage the foreign component. The foreign component (e.g., foreign client) remains under autonomous management as a component of the foreign information management system. Examples of such systems and methods are described in further detail herein, e.g., in regard to FIGS. 2-5. Cross-system storage management components and functionality may be configured and/or incorporated into information management systems such as those described herein in FIGS. 1A-1H.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability. Certain embodiments described herein provide systems and methods capable of addressing these and other shortcomings of prior approaches by implementing unified, organization-wide information management.

Figure 1A:
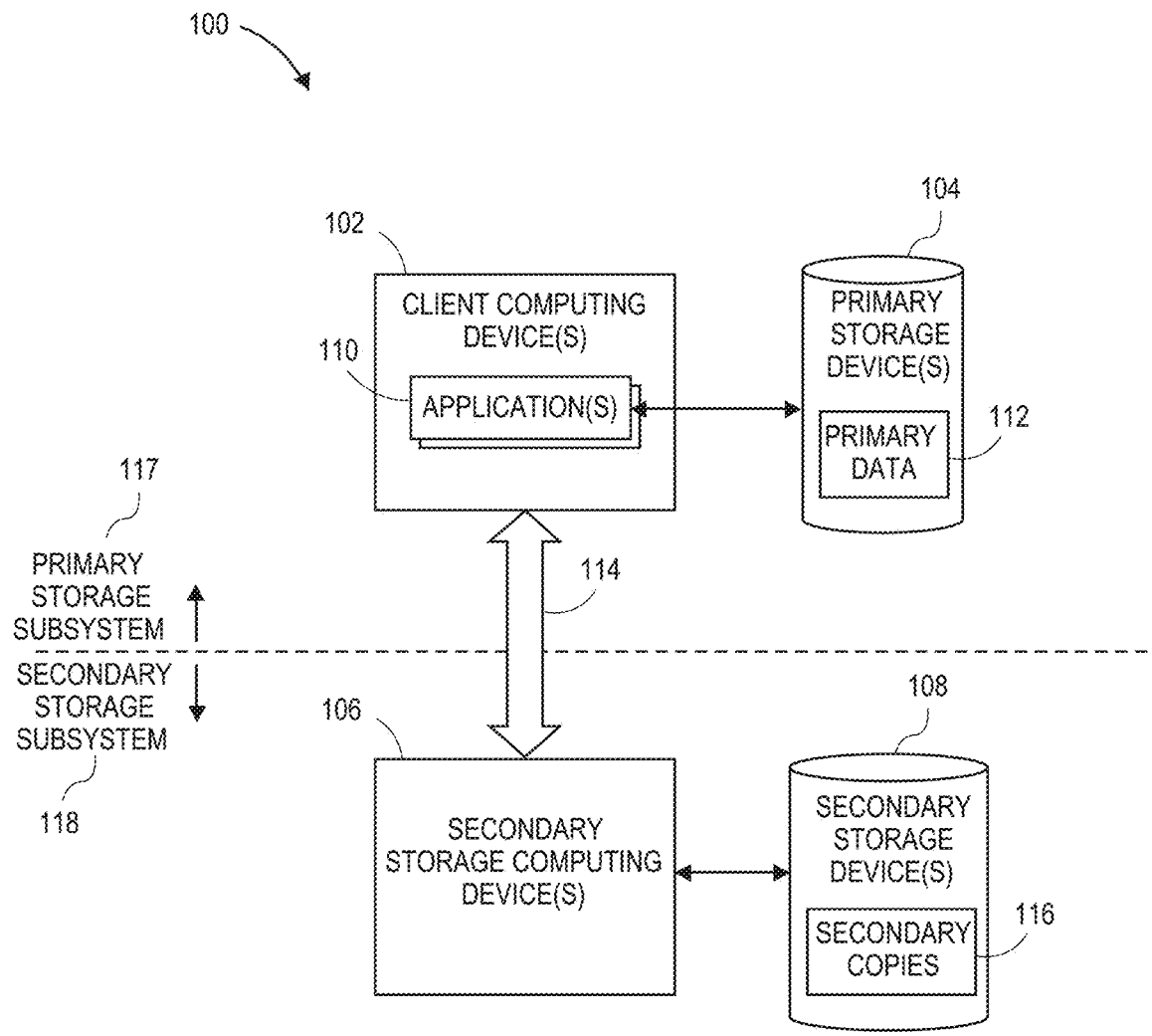
FIG. 1A is a block diagram illustrating an exemplary information management system.

FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";
- U.S. Pat. Pub. No. 2012/0150818, entitled "Client-Side Repository in a Networked Deduplicated Storage System";
- U.S. Pat. No. 8,170,995, entitled "Method and System for Offline Indexing of Content and Classifying Stored Data";
- U.S. Pat. No. 7,107,298, entitled "System And Method For Archiving Objects In An Information Store";
- U.S. Pat. No. 8,230,195, entitled "System And Method For Performing Auxiliary Storage Operations";
- U.S. Pat. No. 8,229,954, entitled "Managing Copies Of Data"; and
- U.S. Pat. No. 8,156,086, entitled "Systems And Methods For Stored Data Verification".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
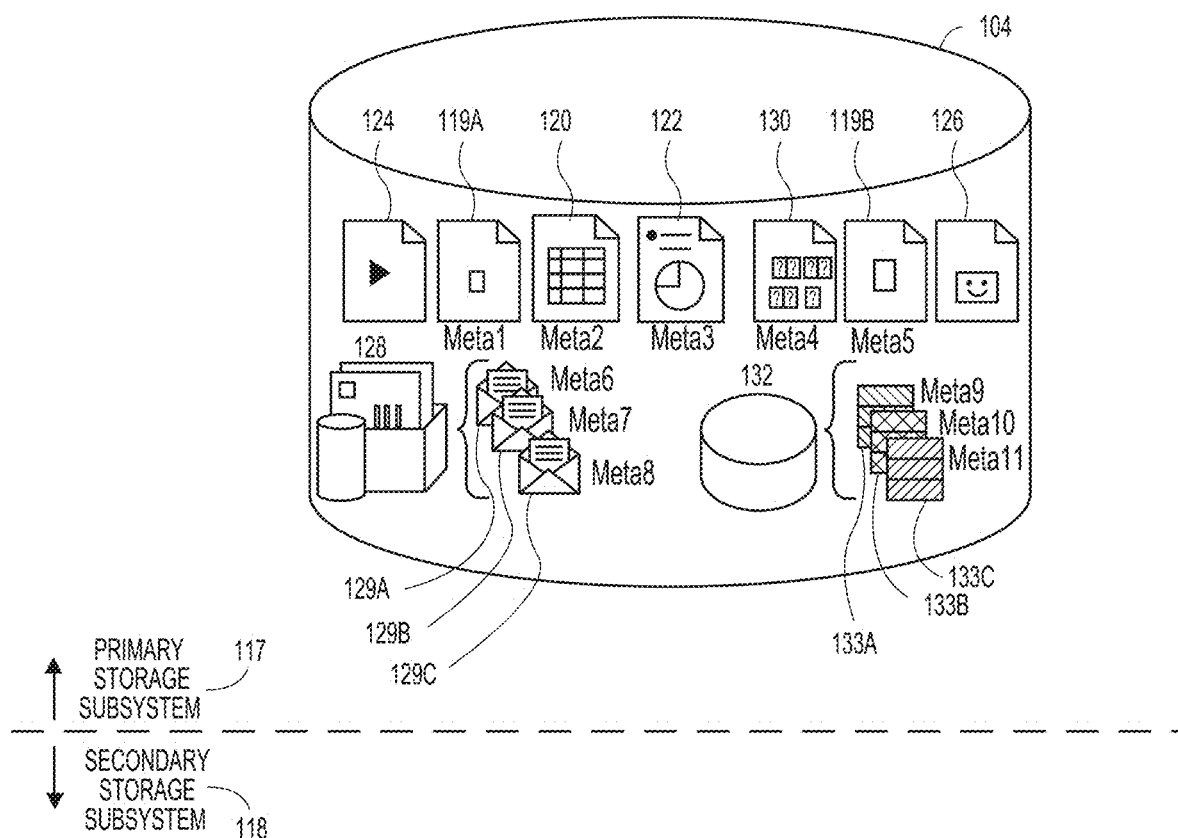
FIG. 1B is a detailed view of a primary storage device, a secondary storage device, and some examples of primary data and secondary copy data.
Figure 1B:
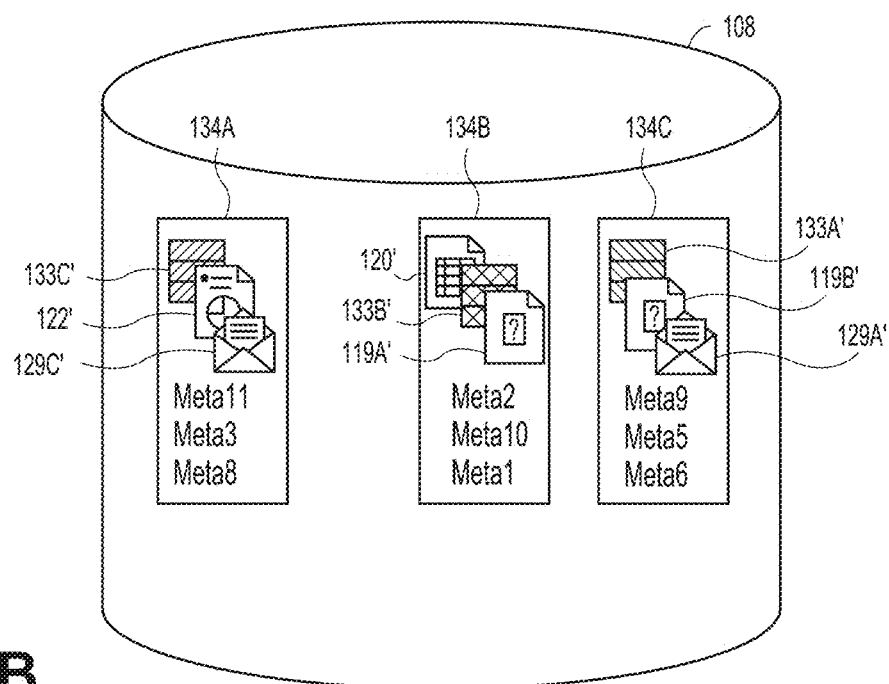

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
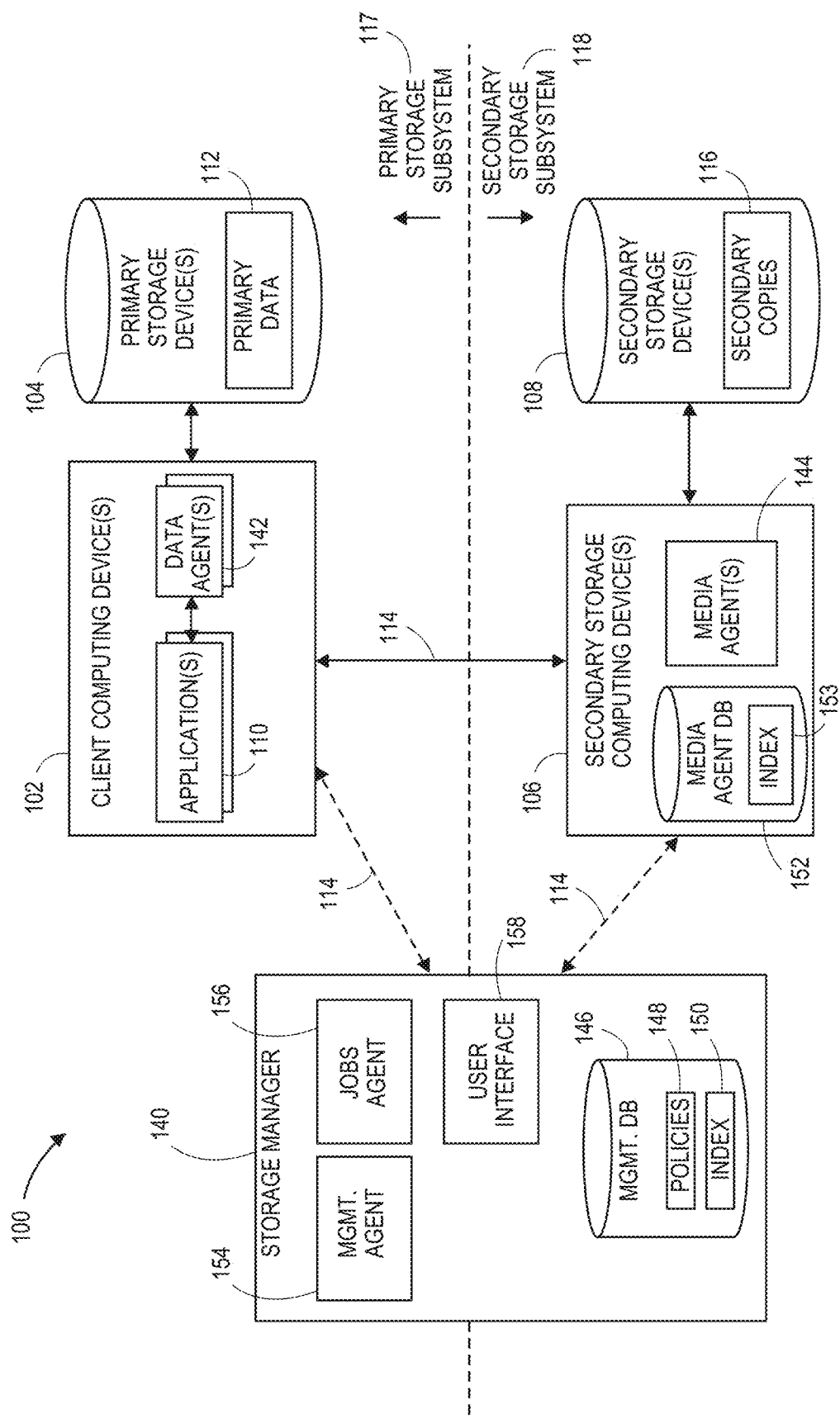
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata.

As shown by the dashed arrowed lines 114, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
 initiating execution of secondary copy operations;
 managing secondary storage devices 108 and inventory/capacity of the same;
 reporting, searching, and/or classification of data in the information management system 100;
 allocating secondary storage devices 108 for secondary storage operations;
 monitoring completion of and providing status reporting related to secondary storage operations;
 tracking age information relating to secondary copies 116, secondary storage devices 108, and comparing the age information against retention guidelines;
 tracking movement of data within the information management system 100;
 tracking logical associations between components in the information management system 100;
 protecting metadata associated with the information management system 100; and
 implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An information management "cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the database 146 is relatively large, the database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
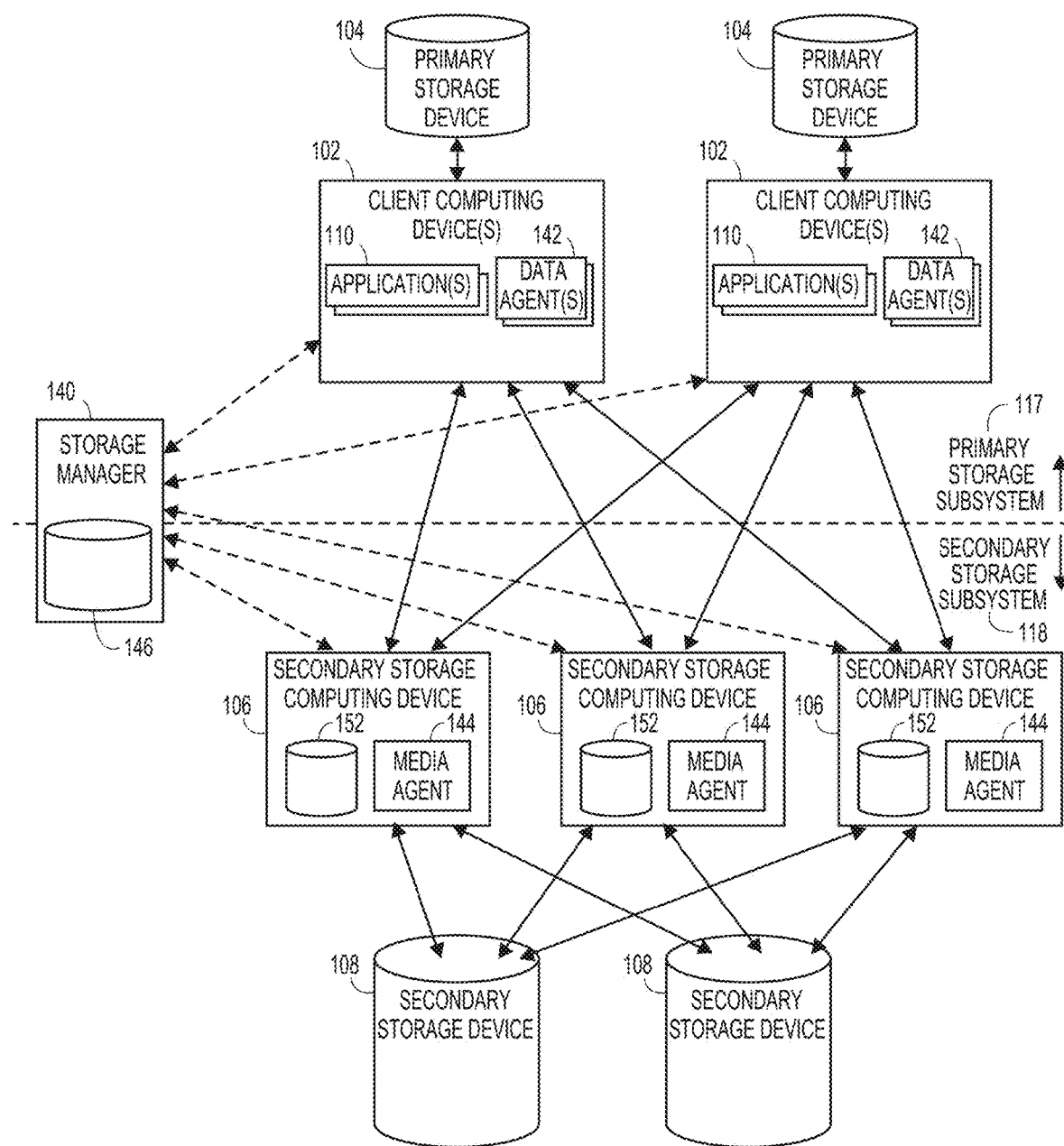
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing platform, e.g., between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to further leverage the data stored in the information management system 100 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components. For instance, there may be a dedicated metabase associated with some or all of the client computing devices 102 and/or media agents 144. In some embodiments, a data classification database may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component in the system may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
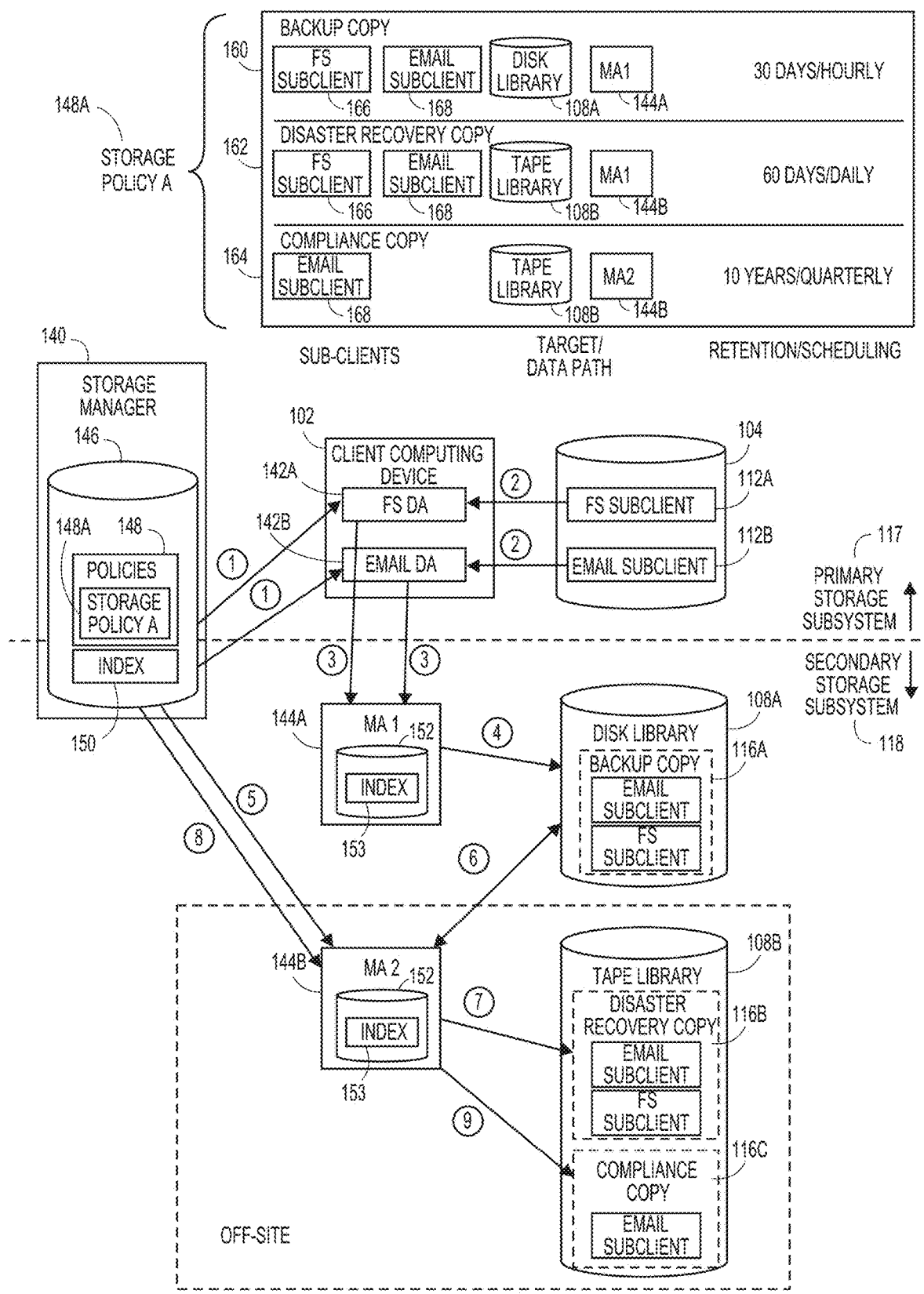
FIG. 1E illustrates certain secondary copy operations according to an exemplary storage policy.

FIG. 1E shows a data flow data diagram depicting performance of storage operations by an embodiment of an information management system 100, according to an exemplary storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
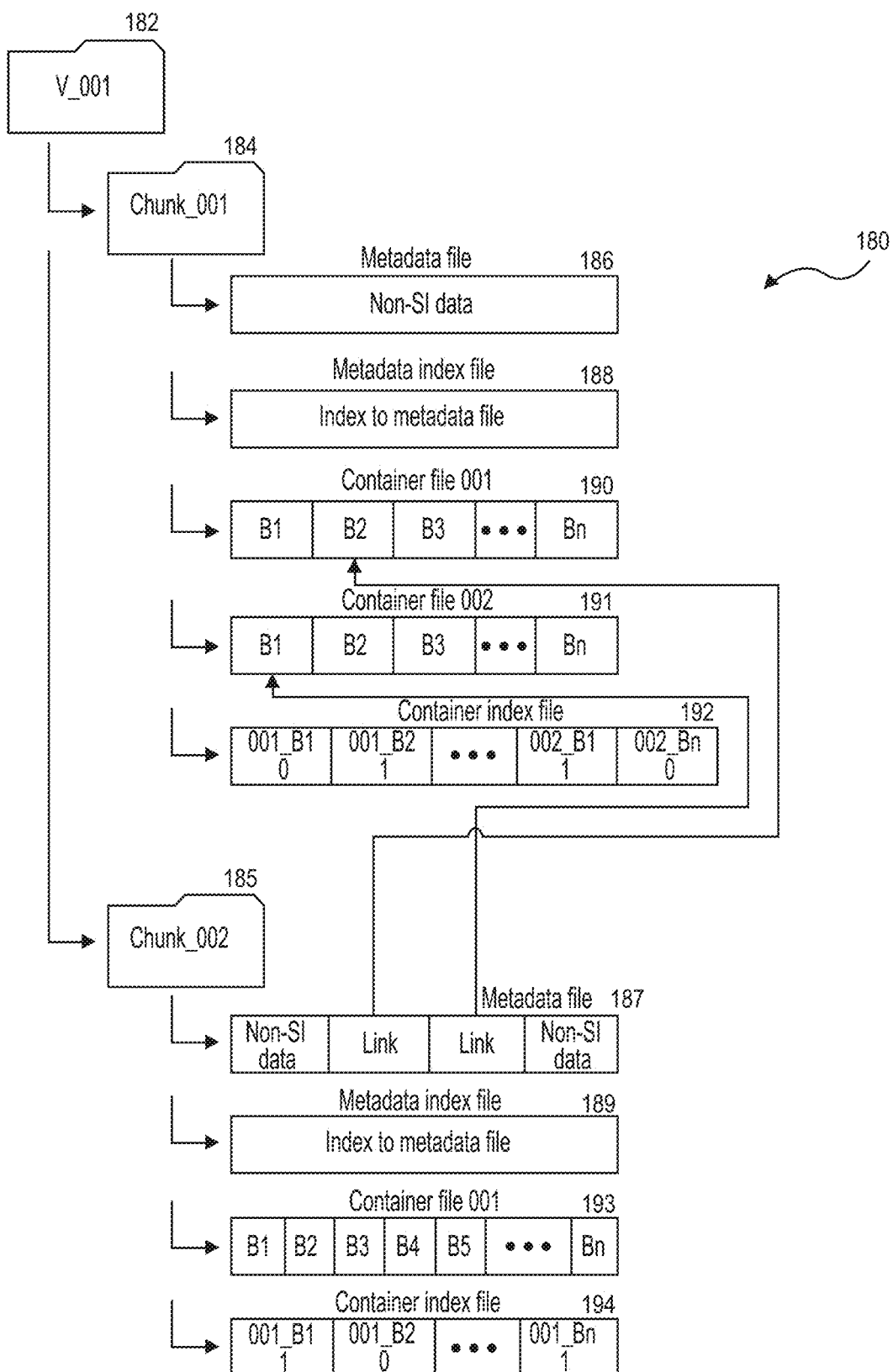

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus require accessing multiple container files, chunk folders, and/or volume folders to obtain the requisite data blocks.

Cross-System Storage Management for Transferring Data Across Autonomous Information Management Systems Typically, each information management system operates under the management of a storage manager 140. Thus, each storage manager manages the particular components of the information management system under its control—and does so separately and autonomously from any other information management systems, which are managed by other respective storage managers. As explained above, some configurations enable a hierarchy of information management systems or cells in which one storage manager acts as the master over subordinate systems/cells and their respective constituent components. However, hierarchical configurations like these, though advantageous in many ways, tend to add complexity to the enterprise as a whole. They typically require substantial infrastructure, administration, ongoing maintenance, and resources, as well as relatively massive exchanges of administrative data and updates. They are not a good fit for every scenario that requires data to be transferred from one information management system to another, and moreover, they do not preserve the autonomy of each information management system. Likewise with configurations wherein a client computing device is configured to be part of two or more different information management systems (or two or more information management cells); overlapping information management systems such as these are not autonomous relative to each other.

One scenario where a hierarchical configuration or an overlapping configuration is unsuitable is when an enterprise faces the need for an occasional data transfer from one information management system to another autonomous information management system. For example, certain data generated by one system's client computing device, (e.g., a computer in the Finance department) is needed by another client computing device that operates in a different information management system (e.g., in the Audit department at a distant location). The Finance department's computing devices are components of one information management system, but the Audit department's computing devices are components of another. But despite the need for the data transfer, the enterprise neither needs nor wants a hierarchical, overlapping, or other complex configuration for such a transaction, and instead needs to maintain the autonomy of the different information management systems. The need exists for a streamlined cross-system storage management operation that transfers data from one component of an information management system to a different component of another autonomous information management system without interfering with or overriding each system's autonomy.

Figure 2A:
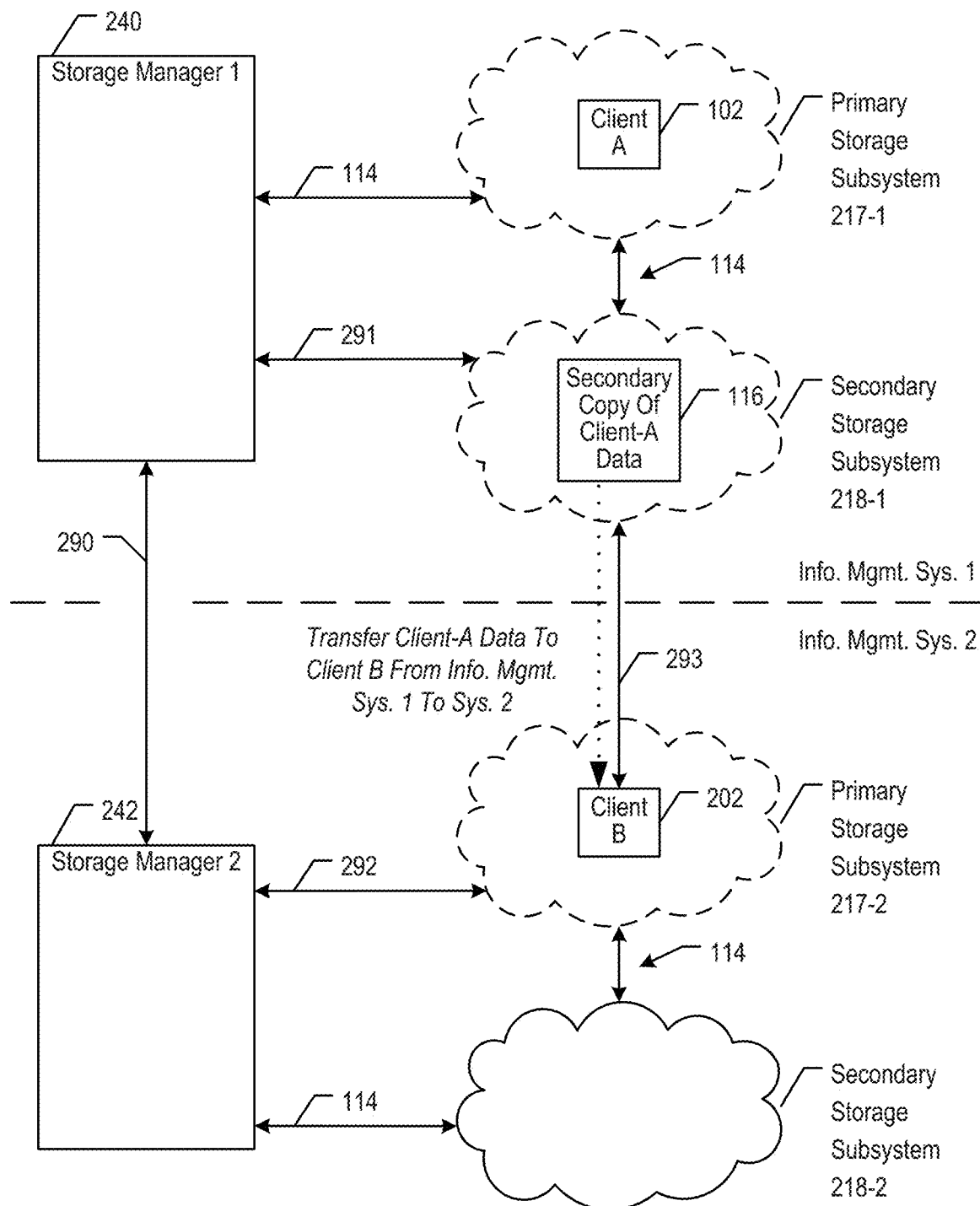
FIG. 2A is a block diagram illustrating some salient portions of a system 200 for transferring one client's data from the secondary storage subsystem of an information management system to a different client in another, autonomous, information management system.

FIG. 2A is a block diagram illustrating some salient portions of an exemplary system 200 for transferring one client's data from the secondary storage subsystem of an information management system to a different client in another, autonomous, information management system. FIG. 2A depicts two autonomous, but communicatively coupled, information management systems, system 1 and system 2. A desired cross-system data transfer of the secondary copy of client-A data 116 to client computing device 202 (client B) is made possible by system 200. Notably, the cross-system data transfer operation according to the illustrative embodiment is consistent with information management operations as described herein, e.g., "restore" 116 to client B, and therefore, the data transfer operation may be tracked, indexed, logged, etc. in accordance with the procedures of the transmitting information management system, e.g., generating corresponding metadata in system 1.

One of the distinguishing characteristics of system 200 is that client B remains at all times, whether or not communicatively coupled to a component of information management system 1, under the autonomous management of storage manager 2 as a component of information management system 2. As noted earlier, this is different from hierarchical or overlapping information management system configurations. Even when receiving the data transfer from information management system 1, client B remains under autonomous management of storage manager 2, and client B may further engage in information management operations within information management system 2 (e.g., data backup of client-B data to secondary storage in 218-2, etc.).

Information management system 1 comprises: storage manager 1 numbered 240; primary storage subsystem 217-1, which comprises client computing device 102 (or "client A"); secondary storage subsystem 218-1, which comprises a secondary copy of client A's data numbered 116; communication path 114 between SM 1 and the primary storage subsystem 217-1; communication path 291 between SM 1 and the secondary storage subsystem 218-1; and communication path 114 between the primary and secondary subsystems, as shown. Elements 102, 114, and 116 are described in the preceding sections.

Information management system 2 comprises: storage manager 2 numbered 242; primary storage subsystem 217-2, which comprises client computing device 202 (or "client B"); secondary storage subsystem 218-2; communication path 292 between SM 2 and primary storage subsystem 217-2; communication path 114 between SM 2 and secondary storage subsystem 218-2; and communication path 114 between the primary and secondary subsystems, as shown.

Client computing device 202, designated here as "client B," is analogous to client computing device 102, and further comprises additional elements that enable the cross-system data transfer from information management system 1 to occur. Client B is described in further detail in a later figure. Client B operates as a component of information management system 2. From the perspective of storage manager 1, client B is said to be a "foreign client."

Primary storage subsystem 217-1, which is part of information management system 1, is analogous to primary storage subsystem 117 described above and further comprises a client computing device 102, designated here as "client A." Client A generates primary data (e.g., production data that originates in information management system 1). Client A's data (illustratively a secondary copy of client A's data, designated element 116) is to be transferred across systems to client B in information management system 2. Primary storage subsystem 217-2, which is part of information management system 2, is also analogous to primary storage subsystem 117, and further comprises client B.

Secondary storage subsystem 218-1, which is part of information management system 1, is analogous to secondary storage subsystem 118 described above, and further comprises a secondary copy of client-A data 116. Secondary storage subsystem 218-2, which is part of information management system 2, is analogous to secondary storage subsystem 118. Secondary storage subsystem 218-2 comprises secondary copy(ies) of client B data (not shown).

Element 240: storage manager 1 (or "SM 1") is a storage manager comprising the components, functionality, and operational characteristics of storage manager 140 described above. SM 1 manages information management system 1. SM 1 further comprises additional functionality and operational characteristics that are described below and with respect to the accompanying figures. For example, SM 1 is capable of initiating and managing a cross-system data transfer operation; to do this, SM 1 comprises appropriate functional modules, data structures, messaging, connectivity, etc.

Element 242: storage manager 2 (or "SM 2") is a storage manager comprising the components, functionality, and operational characteristics of storage manager 140. SM 2 manages information management system 2. SM 2 further comprises additional functionality and operational characteristics that are described below and with respect to the accompanying figures. For example, SM 2 is capable of initiating and/or enabling a cross-system data transfer operation, which is to be managed by SM 1; to do this, SM 2 comprises appropriate functional modules, messaging, connectivity, etc.

Communication pathway (or "path") 290 provides communicative coupling between SM 1 and SM 2, e.g., via respective management agent(s) 154 (not shown), and/or via other special-purpose functional modules, etc., without limitation. Like communication pathways 114, path 290 can include one or more public and private networks, network elements, transport technologies, and/or routing/switching technologies over local and/or wide area territory, wired and/or wireless, etc., as described for pathways 114. SM 1 and SM 2 may be in direct electronic communication, e.g., via dedicated lines; or may be indirectly connected, e.g., via public and/or private telecommunications network(s) such as a private intranet and/or the Internet, without limitation. Communication path 290 need not be persistent (i.e., always "on") and may be an intermittent connection (e.g., on demand, scheduled, etc.) that is initiated by either one of SM 1 or SM 2.

Communication pathway 291 provides communicative coupling between SM 1 and one or more components of secondary storage subsystem 218-1. As explained above in regard to path 290, path 291 may comprise one or more sub-elements and technologies, may be direct or indirect, and may or may not be a persistent connection as to any one component. Path 291 additionally may carry specialized messaging and/or signaling to support the functionalities of the illustrative embodiment.

Communication pathway 292 provides communicative coupling between SM 2 and one or more components of primary storage subsystem 217-2. As explained above in regard to path 290 and path 291, path 292 may comprise one or more sub-elements and technologies, may be direct or indirect, and may or may not be a persistent connection as to any one component. Path 292 additionally may carry specialized messaging and/or signaling to support the functionalities of the illustrative embodiment.

Communication pathway 293 provides communicative coupling between client B in information management system 2 and, at any given time, one or more components of secondary storage subsystem 218-1 in information management system 1; path 293 enables a copy of client-A data to be transferred (i.e., electronically transmitted) cross-system from information management system 1 to information management system 2. As explained above in regard to paths 290, 291, and 292, path 293 may comprise one or more sub-elements and technologies, may be direct or indirect, and may or may not be a persistent connection. Path 293 additionally may carry specialized messaging and/or signaling to support the functionalities of the illustrative embodiment.

System 200 may comprise both information management system 1 and information management system 2, or just one of them, or components thereof, or any number of information management systems, in any combination, without limitation. A configuration wherein system 200 comprises more than one information management system, such as system 1 and system 2, does not negate the autonomy of one constituent information management system relative to the other.

Figure 2B:
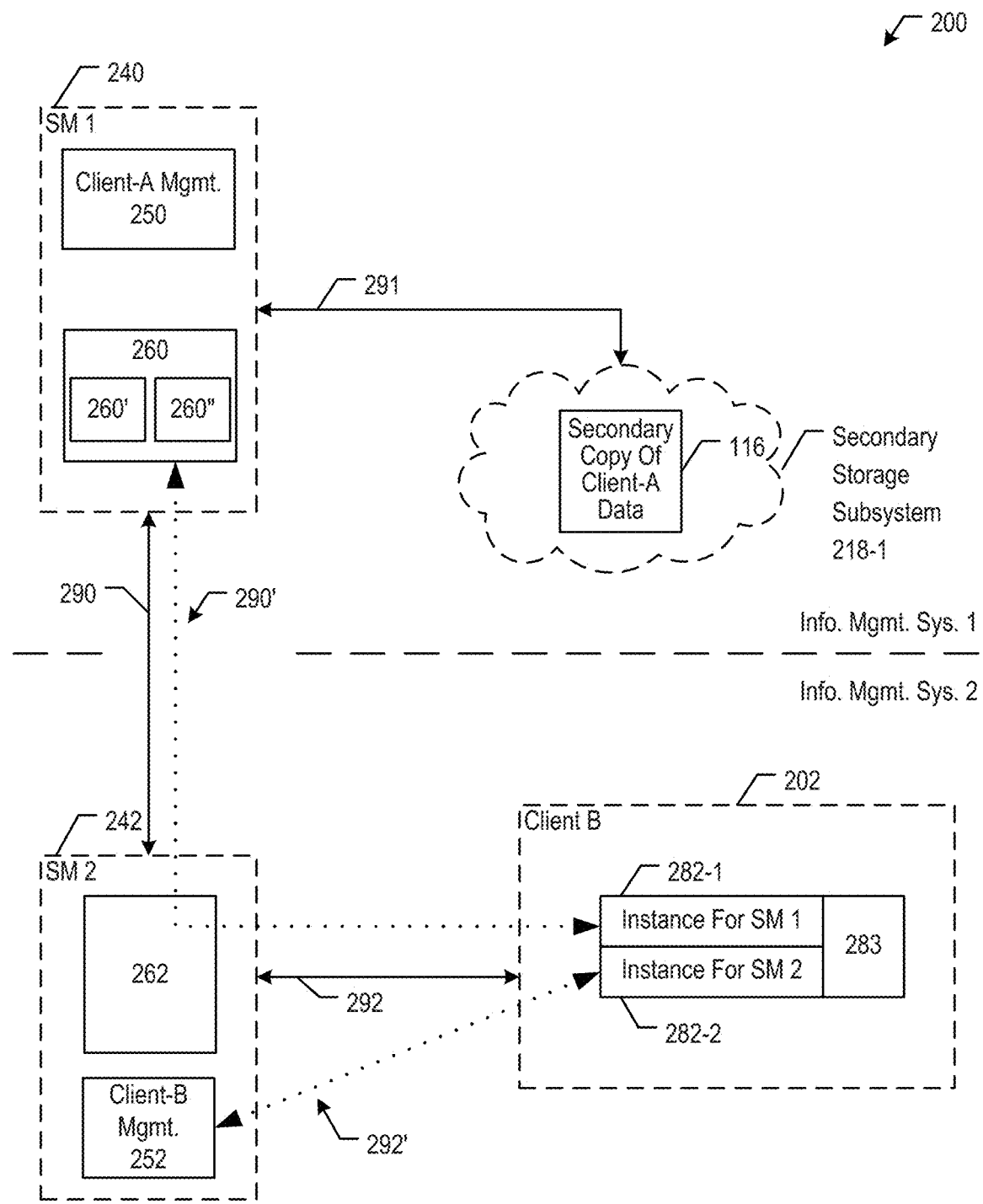
FIG. 2B is a block diagram detailing some elements of system 200.

FIG. 2B is a block diagram detailing some elements of system 200. FIG. 2B depicts: SM 1 comprising a module 250 and a module 260; communication path 291; secondary storage subsystem 218-1, which comprises a secondary copy of client-A data 116; communication path 290; SM 2 comprising module 252 and module 262; communication path 292; client computing device 202 comprising binary files 283; and a first instance 282-1 of an information management software, which software instance may execute on device 202, and a second instance 282-2 of the information management software, which software instance may execute on device 202. The other elements depicted here were described in regard to the preceding figure.

Module 250 in SM 1 ("Client-A Mgmt.") logically comprises the management elements needed by SM 1 to properly manage client A (and likely other clients, not shown) as components of information management system 1. Module 250, which is shown as a unified block in the present figure, logically comprises aspects of information management policies 148 and index 150 and jobs agent 156 (described above) as they pertain to client A. For example and without limitation, module 250 logically comprises storage policies to protect client-A data, storage management job status and tracking with respect to client-A data, indexing/metadata of movement of data from primary storage associated with client A to secondary storage devices 108 that store the secondary copy of client-A data 116, data/metadata associating client A with a particular media agent and/or secondary storage device, as specified in a given storage policy, etc. Notably, according to the illustrative embodiment, module 250 is not accessible to SM 2, because client A operates under autonomous management by SM 1 as a component of information management system 1. Client A is not a component of information management system 2.

Module 252 in SM 2 ("Client-B Mgmt.") logically comprises the management elements needed by SM 2 to properly manage client B (and likely other clients, not shown) as components of information management system 2. Module 252, which is shown as a unified block in the present figure, comprises aspects of information management policies 148 and index 150 and jobs agent 156 (described above) as they pertain to client B in information management system 2. For example and without limitation, module 252 logically comprises storage policies to protect client-B data, storage management job status and tracking with respect to client-B data, indexing/metadata of movement of data from primary storage associated with client B to secondary storage devices in secondary storage subsystem 218-2, data/metadata associating client B with a particular media agent and/or secondary storage device, as specified in a given storage policy, etc. Notably, according to the illustrative embodiment, module 252 is not accessible to SM 1, because client B operates under autonomous management by SM 2 as a component of information management system 2. Client B is not a component of information management system 1.

Module 260 in SM 1 logically comprises a data structure 260' and a functional sub-module 260" that operate in reference cross-system data transfer operation(s). In some embodiments, module 260 is a unified module comprising its constituent components, and in alternative embodiments the constituent components are separately situated in other functional modules and/or components of information management system 1. SM 1 may be configured for any number of cross-system data transfers to one or more foreign clients such as client B operating in any number of foreign information management systems.

Data structure 260' is a special-purpose ("registry-only") data structure used by SM 1 to manage cross-system data transfer(s). Data structure 260' comprises, e.g., a minimal amount of information about a given foreign component such as client B, sufficient for SM 1 to manage the cross-system data transfer from information management system 1 to the foreign component, but not more. This information is received from and/or via SM 2. In contrast to module 250 and any associated functionality whereby SM 1 manages client A as a fully functional component of information management system 1, data structure 260' provides SM 1 with just enough foreign-component (e.g., client B) information to allow for the data transfer—hence the information in data structure 260' is referred to as "registry-only." The registry-only information in data structure 260' is also insufficient for SM 1 to manage the foreign component (e.g., client B) as a component of information management system 1; the foreign component such as client B remains at all times under autonomous management by SM 2 as a component of information management system 2 (whether or not the foreign component (e.g., client B) is communicatively coupled to one or more components of information management system 1 at any given time).

Registry-Only Information. Illustratively and without limitation, in reference to illustrative foreign component client B, data structure 260' includes the following registry-only information: host name of client computing device 202, client name of client B as defined in information management system 2, and in some embodiments also includes a digital certificate to enable secure communications to/from client B. In contrast, module 250 whereby SM 1 manages client A as a component of system 1, includes a number of management elements, such as jobs data, storage policies, identities of associated media agents, secondary storage indexing, etc. No such management elements are transmitted by SM 2 to SM 1 in reference to client B, and therefore no such information is available to SM 1 to store in data structure 260', and consequently SM 1 is not capable of asserting management control over client B. Thus, SM 1 "knows about" the existence of client B, enough to have data transferred to client B, but SM 1 cannot manage client B. Each foreign component such as client B that belongs to a foreign information management system other than information management system 1 may have its own uniquely configured data structure 260' in SM 1.

Functional module 260″ enables SM 1 to initiate, manage, monitor, terminate, and/or report on any cross-system data transfer from information management system 1 to a foreign component (e.g., client B) in information management system 2. Functional module 260″ may logically comprise one or more sub-components that reside in one or more other functional modules of SM 1. For example, communications functions for communicatively coupling to SM 2 may be part of a module analogous to management agent 154; this may also include new messages, signaling, and status elements. For example, user interface elements may be added to a module analogous to user interface module 158, for example, to allow a user to invoke a transfer of data from information management system 1 to a foreign component (e.g., "restore" a secondary copy of client-A data to client B in information management system 2, accept a "restore-to-client-B" request from SM 2, etc.). Each foreign component such as client B that belongs to a foreign information management system other than information management system 1 may have its own uniquely configured functional module 260″ in SM 1, as appropriate. In some embodiments, functional module 260″ may support any number of foreign components in any number of foreign information management systems. Functional module 260″ supports any number of simultaneous cross-system data transfers according to the illustrative embodiments. Moreover, the management that SM 1 exerts over client A is autonomous from any cross-system data transfer managed by SM 1.

In some embodiments, module 260 also incorporates the functionality of module 262 described below, such that one or more clients that operate in information management system 1 such as client A may be "foreign clients" to another foreign information management system such as information management system 2.

Module 262 in SM 2 supports cross-system data transfers from another "foreign" information management system to a component of information management system 2. For example, the indirect communicative coupling between SM 1 and client B illustrated by dotted communication path 290′ is made possible by module 262, e.g., module 262 operates as an intermediary, interpreter and/or relay between SM 1 and client B. Module 262 enables SM 2 to request and/or respond to requests for and to participate in and/or facilitate cross-system data transfers to a component such as client B in information management system 2. Module 262 may logically comprise sub-components that reside in one or more other functional modules of SM 2. For example, communication functions for communicatively coupling to SM 1 may be part of a module analogous to management agent 154; this may include new messages, signaling, and status elements for cross-system data transfers; likewise new commands, instructions, and/or messages for communicating with client B in reference to a cross-system data transfer also may be part of such an agent or may be a separate sub-module (for example, for instructing client B to create and/or activate a second instance of information management software 282 that resides on client B). For example, user interface elements may be added to a module analogous to user interface module 158. Each local client such as client B that is a proper target for a cross-system data transfer may have its own uniquely configured module 262 as appropriate. In some embodiments, module 262 may support a plurality of local clients.

Also, SM 2 may comprise a specially configured instance of module 262 for each foreign storage manager such as SM 1; for example, an instance of module 262 may be created by SM 2 when it receives a request or inquiry from a given foreign storage manager. Module 262 supports any number of simultaneous cross-system data transfers according to the illustrative embodiment. Moreover, the management that SM 2 exerts over a local client such as client B is autonomous from any cross-system data transfer managed by SM 1 to that same local client. In some embodiments, module 262 on SM 2 also incorporates the functionality of module 260 described above.

Client B. To operate as a "client" component in information management system 2 (herein designated "client B"), client computing device 202 executes information management software (e.g., storage management software, data management and protection software, data management software, etc., which is illustratively designated 282 (not shown)). The particular software instance of the information management software that executes in this context enables SM 2 to protect and manage at least some of the data generated at device 202, and may comprise a data agent described above. Accordingly, when an instance (or "software instance") 282-2 of the information management software executes on client computing device 202, client B operates under the management of SM 2 as a component of information management system 2. This relationship is depicted by the dotted communication path 292′ between software instance 282-2 and module 252. Software instance 282-2 uses, e.g., binary files 283. An instance of a software program is a copy of an executable version of the software program (e.g., information management software 282) that has been written to the memory of a computing device on which the software instance executes.

According to the illustrative embodiment, plural instances of the information management software execute on a given client computing device, based on shared binary files 293, such that each executing software instance 282-*n* is directed to interactions with a respective storage manager. Illustratively, software instances 282-1 and 282-2 execute on client computing device 202.

When software instance 282-1 executes, client B may receive data transfer(s) from information management system 1. Software instance 282-1 relates to SM 1 for purposes of cross-system data transfers. Communicative coupling between SM 1 and client B is indirect, such that the communication path therebetween comprises SM 2, as illustrated by the dotted path designated 290′. Any messages (e.g., commands, queries, instructions, etc.) from SM 1 that may be ultimately directed to client B, are therefore received and processed by SM2, and may be transmitted by SM 2 to client B as appropriate. In some embodiments SM 1 may establish a direct communication path to client B (using software instance 282-1). Software instance 282-1 may execute concurrently with software instance 282-2, but software instance 282-1 need not be always executing. As explained later on, software instance 282-1 may begin executing on demand or on a schedule, and in some embodiments it does so under instructions received from SM 2 and/or SM 1.

Shared binary files (or "shared binaries") 283 illustratively comprise object code (e.g., an executable version of the information management software (e.g., .EXE file), associated libraries (e.g., ".DLL" file(s)), etc.), which may execute on the client computing device 202 as one or more software instances 282-*n*. By sharing one set of binary files, only one version of the information management software needs to be maintained and/or upgraded in a given client. This tends to make system 200 less prone to error and more efficient to operate. More generally, the use of multiple software instances of the same information management software and the sharing of binaries 283 is advantageous, because it is simple to set up and configure and consumes Client-B memory sparingly. In contrast, separate installations of the information management software would involve redundant binaries, would take longer, and would be prone to user error or software incompatibilities among the separate installations.

Figure 2C:
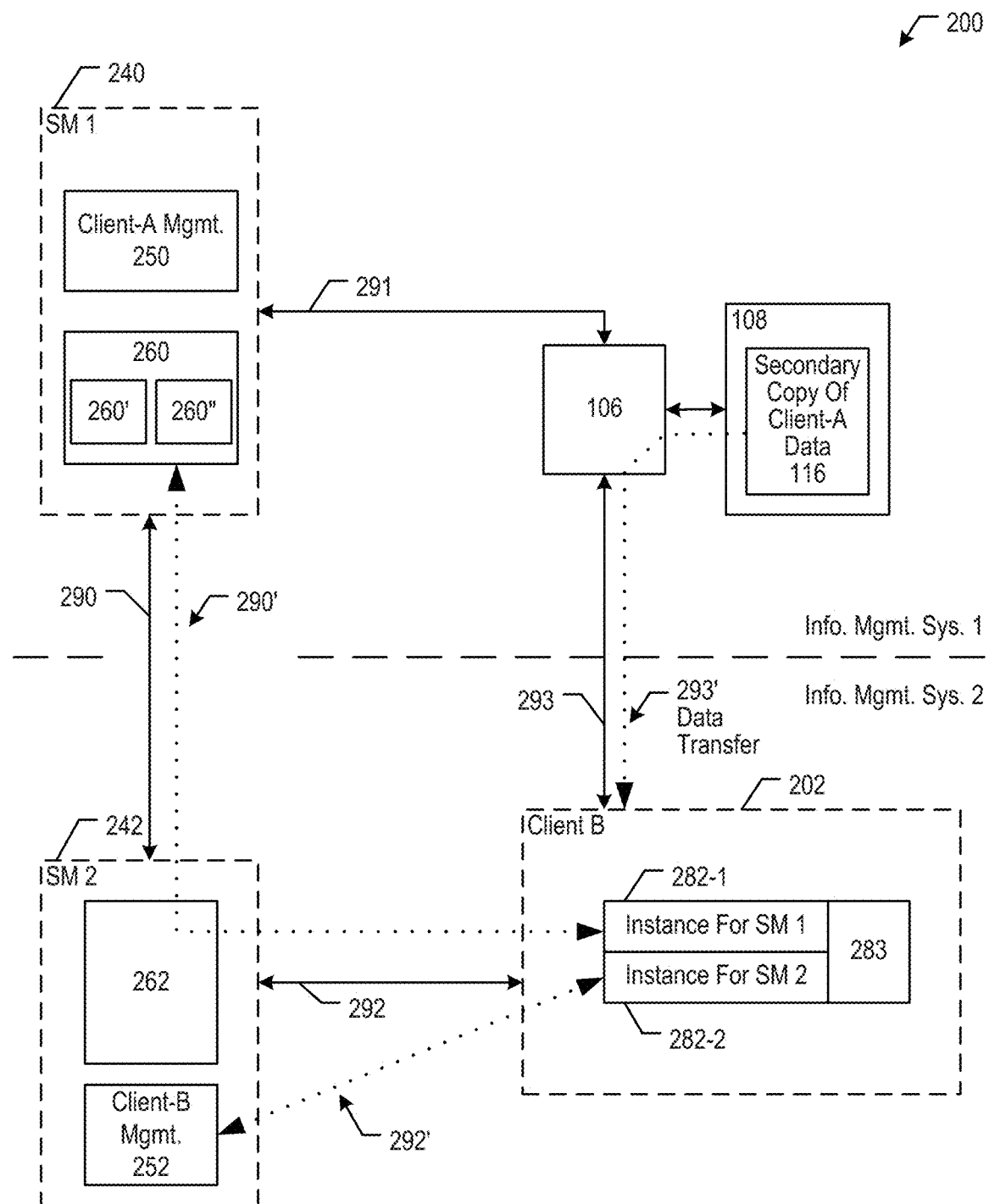
FIG. 2C is a block diagram detailing some additional elements of system 200.

FIG. 2C is a block diagram detailing some additional elements of system 200 that were not shown in the preceding figures, including: secondary storage computing device 106; secondary storage device 108, comprising the secondary copy of client-A data 116; communication path 293 connecting client B and device 106; and the cross-system data transfer 293' that moves data from 108 via 106 to client B.

Secondary storage computing device 106 was described in detail above. Device 106 in the present Figure comprises several components of information management system 1, including media agent(s), a media agent database, and an associated index. In reference to the illustrative embodiment of the present invention, at least one media agent on device 106 is associated with the secondary copy of client-A data 116 that resides on storage device 108.

Secondary storage device 108 was described in detail above, and comprises a secondary copy of client-A data 116 that is to be transferred cross-system to client B. In some embodiments, the data to be transferred from information management system 1 to information management system 2 resides in a component of information management system 1 other than a secondary storage device, e.g., in primary storage, in tertiary storage, on a media agent, on a storage manager, etc.

Communication path 293, which is established under the management of SM 1 (e.g., executing module 260, etc.), communicatively couples client B and device 106. According to the illustrative embodiment, communication path 293 is established on demand for each cross-system data transfer, but in some embodiments path 293 is established and torn down on a schedule, and in some embodiments it persists indefinitely.

Cross-system data transfer 293' comprises source data 116 being retrieved from secondary storage on device 108 and transmitted via device 106 to client B. This is illustrated by the dotted line 293'.

System 200 is merely an illustrative embodiment, and many variations can be envisioned within the scope of the present invention. Alternative embodiments may comprise any number of constituent components and subsystems, e.g., any number of information management systems, any number of storage managers, any number of "source" clients such as client A, any number of "foreign" or "target" components such as client B, and any number of simultaneous and/or sequential cross-system data transfers in any direction and/or bi-directionally between systems. For example, although client B is shown with only two instances of the information management software 282, any number of software instances is possible, each relating to a distinct storage manager. The source data (e.g., 116) may be obtained from any number of clients such as client A. The cross-system data transfers may occur to any number of foreign components such as client B in one or more information management systems.

Figure 3:
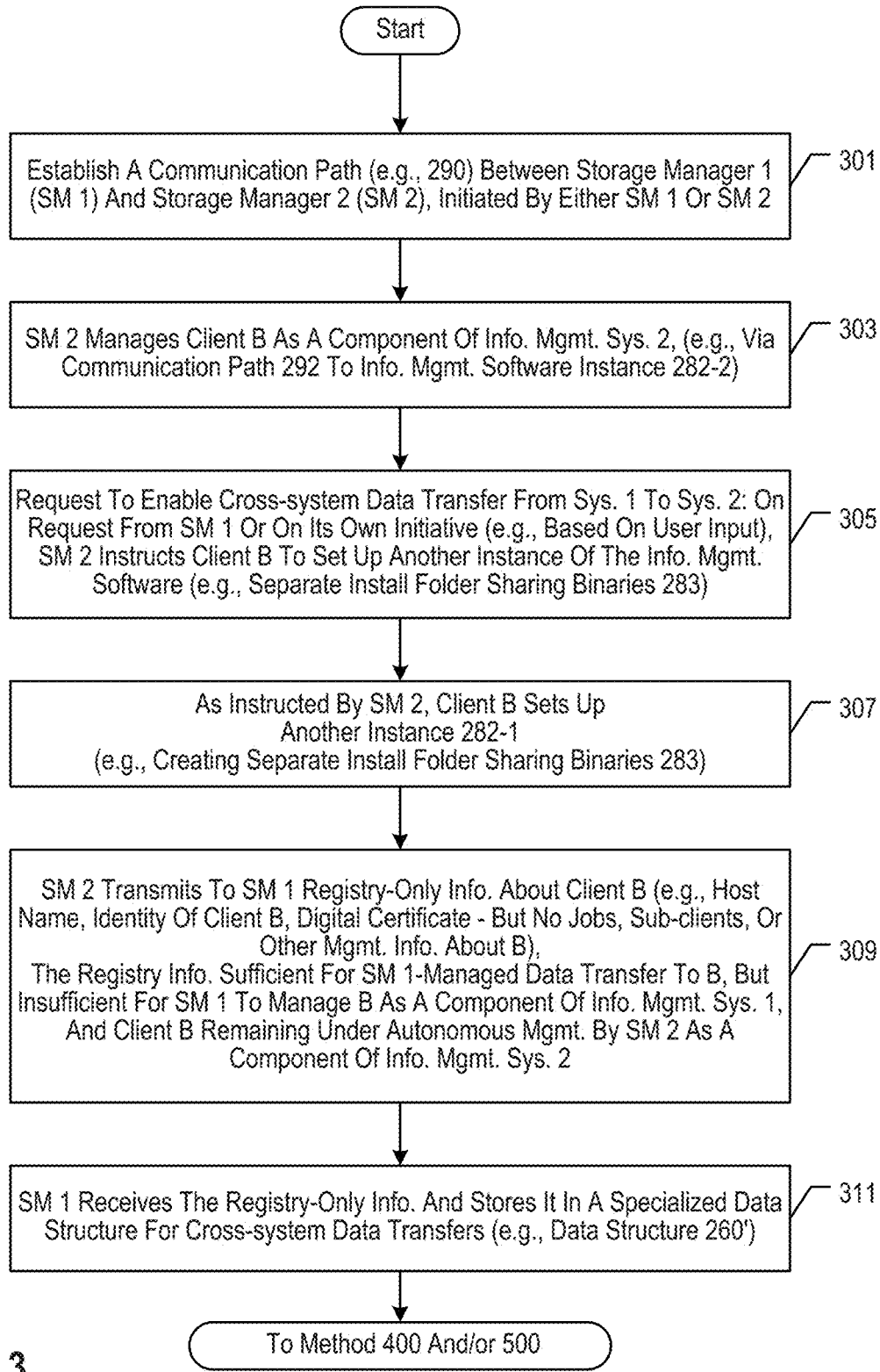
FIG. 3 depicts some salient operations of a method 300 according to an illustrative embodiment of the present invention.

FIG. 3 depicts some salient operations of a method 300 according to an illustrative embodiment of the present invention. Illustrative system 200 and relevant components thereof execute method 300 as described in further detail below. Method 300 is at least in part directed at enabling a cross-system data transfer to occur in system 200, e.g., by setting up communication path(s), transmitting necessary information, establishing software instances, etc. To actually execute a cross-system data transfer, control passes from method 300 to method 400 and/or method 500 described in later figures.

At block 301, a communication path (e.g., 290) is established between SM 1 and SM 2. The communication path may be originated by SM 1 and/or SM 2 at any time. The communication path may be initiated on demand, e.g., based on user input from the respective storage manager's console/user interface, and/or it may automatically set up and/or tear down according to administrative criteria.

At block 303, SM 2 manages client B such that client B operates as a component of information management system 2, e.g., according to module 252. Client B is communicatively coupled to SM 2 via communication path 292, using a first instance of information management software 282-2, based on binary files 283.

At block 305, SM 2 receives from SM 1 a request to enable (i.e., to set up but not necessarily to execute) a cross-system data transfer from information management system 1 to information management system 2. The request may (i) comprise a request for a list of clients in information management system 2 that are available to receive the data (i.e., candidate target clients), (ii) request only one target client, or (iii) may identify a particular client such as client B, which would be known to SM 1 from a previous cross-system data transfer or communication with SM 2. Alternatively, the request comes from a user of SM 2.

Based on the request, SM 2 may respond with a list of candidate target clients, upon which SM 1 transmits a selection (e.g., client B). Once client B has been selected as the target client, SM 2 instructs client B to set up another instance of the information management software for use with SM 1. SM 2 accordingly transmits the instruction(s) via communication path 292 to software instance 282-2, which is executing on client B. The instructions may comprise the specifics of how to do this, e.g., instructions to create an installation folder pointing to shared binaries 283.

At block 307, as instructed by SM 2, client B sets up another instance of the information management software for use with SM 1, e.g., instance 282-1, such as by creating an installation folder relating to SM 1, which folder points to shared binaries 283. According to the illustrative embodiment, the configuration is based on sharing the binaries 283 that instance 282-2 uses, but other embodiments may implement a different solution.

At block 309, SM 2 transmits to SM 1 registry-only information about client B. As explained earlier in regard to module 260, the information transmitted may be the minimum "registry-only" information required to make a cross-system data transfer possible, e.g., host name, client name, and in some embodiments a digital certificate. However, no information about client B's data, sub-clients, applications, data agents, etc. is transmitted to SM 1, i.e., no information is transmitted that would place client B under the management of SM 1 as a component of information management system 1. Client B remains under the management of SM 2 as a component of information management system 2. One advantage of this lightweight amount of information transfer is that it keeps communications between SM 2 and SM 1 efficient, and also takes only a light toll on processing cycles of SM 1 and SM 2.

At block 311, SM 1 receives the registry-only information about client B from SM 2 and stores it in a specialized data structure (e.g., 260') to be used in managing the cross-system data transfer to client B. Control passes from this point to method 400 and/or method 500.

Figure 4:
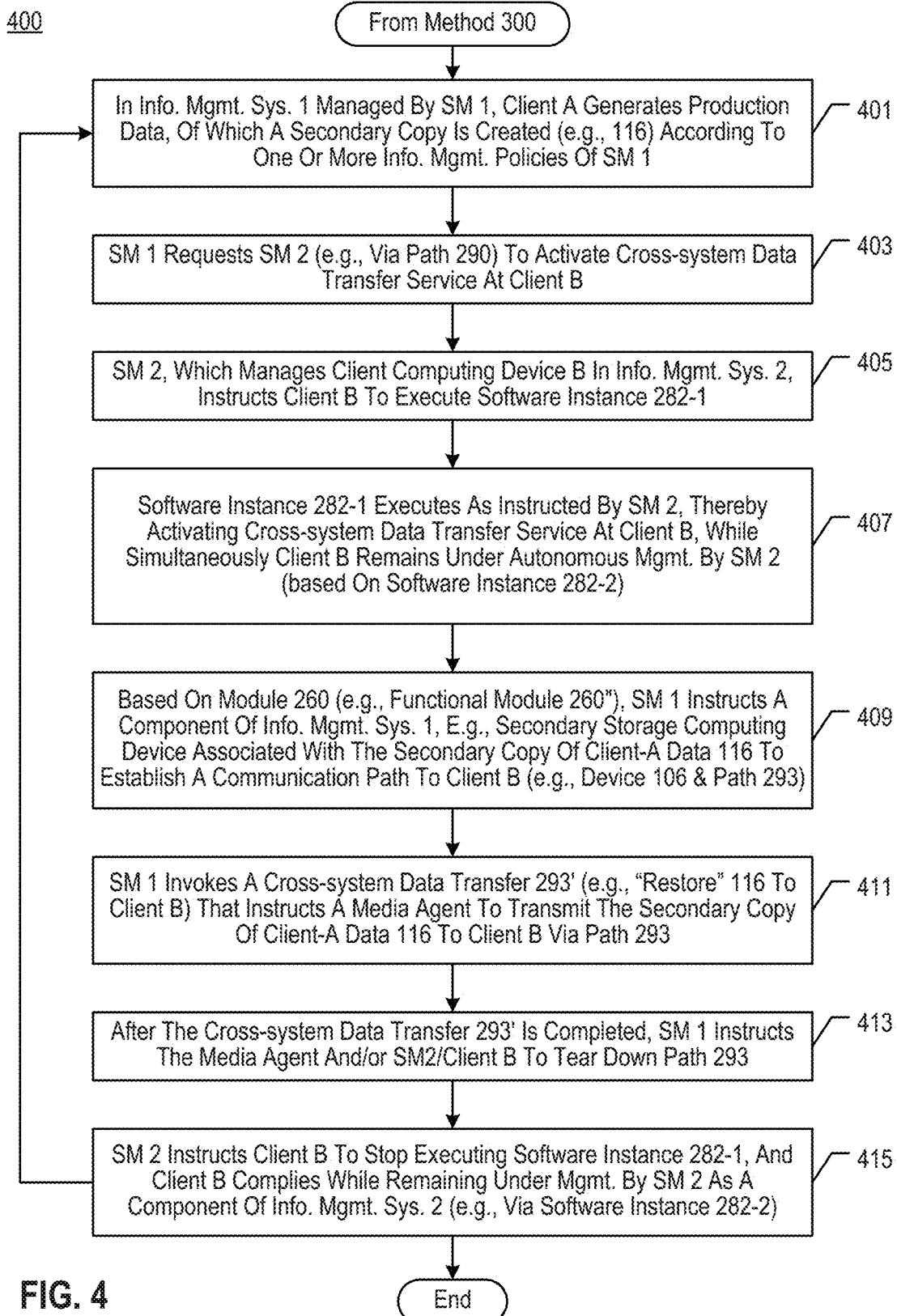
FIG. 4 depicts some salient operations of a method 400 according to an illustrative embodiment of the present invention.

FIG. 4 depicts some salient operations of a method 400 according to an illustrative embodiment of the present invention. Illustrative system 200 and relevant components thereof execute method 400 as described in further detail below. Control passes to method 400 from method 300. Based at least in part on the enabling operations of method 300, method 400 is at least in part directed at executing a cross-system data transfer, e.g., by activating services at client B, instructing a component to transfer data to client B, etc.

At block 401, in information management system 1, which is managed by SM 1, client A generates production data. According to information management policies promulgated by SM 1, a secondary copy 116 of at least some client-A data is created and stored in a component of the secondary storage subsystem 218-1, e.g., in secondary storage device 108.

At block 403, SM 1 requests SM 2 (e.g., via communication path 290) to activate cross-system services at client B. SM 1 may have selected client B from a plurality of candidates supplied previously by SM 2 and other storage managers, or SM 2 may have identified client B as the particular target in an earlier communication to SM 1. Alternatively, SM 1 requests SM 2 to activate cross-system services at some unspecified client and to inform SM 1 of the choice of client.

At block 405, SM 2 (having been instructed or having autonomously selected client B) instructs client B to execute software instance 282-1 that relates to SM 1. This instance was previously set up but was not executing on client B until presently instructed by SM 2.

At block 407, as instructed by SM 2, client B begins executing software instance 282-1 (e.g., sharing binaries 283). By doing so, client B activates cross-system services at client B. As a result, client B may receive and interpret instruction(s) from SM 1 relating to cross-system data transfer, which instructions are received via SM 2. Also, by activating cross-system services, client B may receive connection/communication requests from a component of information management system 1 to execute a data transfer therefrom. Simultaneously, client B remains under autonomous management by SM 2 as a component of information management system 2 (using software instance 282-2).

At block 409, SM 1 (based on module 260) instructs a media agent in information management system 1 that is associated with the secondary copy of client-A data 116 to establish a communication path to client B. The instruction is based on the registry info about client B that SM 1 has in data structure 260'. The media agent 144 complies and establishes a data path, e.g., 293, to client B, and may not be aware that client B is a foreign client or that client B is a component of another information management system. For example, the media agent may be instructed to "restore" client-A data 116 to client B.

At block 411, SM 1 invokes a cross-system data transfer operation, instructing that the secondary copy of client-A data 116 is to be transmitted by media agent 144 to client B. The operation may be on demand (e.g., driven by user input at SM 1 or SM 2, driven by the creation of new data at client A, driven by demand for data at Client B, etc.) and/or scheduled and/or a combination, without limitation. A secondary copy of client A-data 116 is transferred accordingly to client B (e.g., via path 293), thus completing the cross-system data transfer 293'. As noted earlier, thanks to data structure 260', SM 1 knows enough about the existence of client B to properly manage a data transfer to client B from one or more components of information management system 1.

At block 413, after the data transfer 293' is completed, SM 1 instructs media agent 144 and/or client B (via SM 2) to tear down the communication path therebetween, e.g., path 293. In alternative embodiments, SM 1 reports the completion of the data transfer to SM 2, which then proceeds to the next block.

At block 415, after the data transfer 293' is completed, SM 2 instructs client B to stop executing software instance 282-1, while client B remains under SM 2's management as a component of information management system 2. One of the effects of stopping the execution of software instance 282-1, is that any communications from/to any component(s) of information management system 1 end and any respective communication paths (e.g., 290', 293) are torn down. Method 400 may then loop back to block 401.

Activating the execution of software instance 282-1 and then deactivating it as described herein (whether on demand or on a schedule) has a number of advantages. For example, communication paths and the connectivity and processing resources they consume are minimized and used only sparingly. Another corollary advantage is that this architecture enables a plurality of autonomous information management systems to exchange data in a "lightweight" manner that maintains storage management principles/features (e.g., indexing, and generation/storage of metadata), yet does not burden the systems with complex interconnections/hierarchies that need constant maintenance. The use of software instance(s) of a given information management software using shared binaries (e.g., 282-n), means that administrators need not perform multiple full-blown installations of information management software, thus assuring that software versions are uniform and occupy a small footprint.

Figure 5:
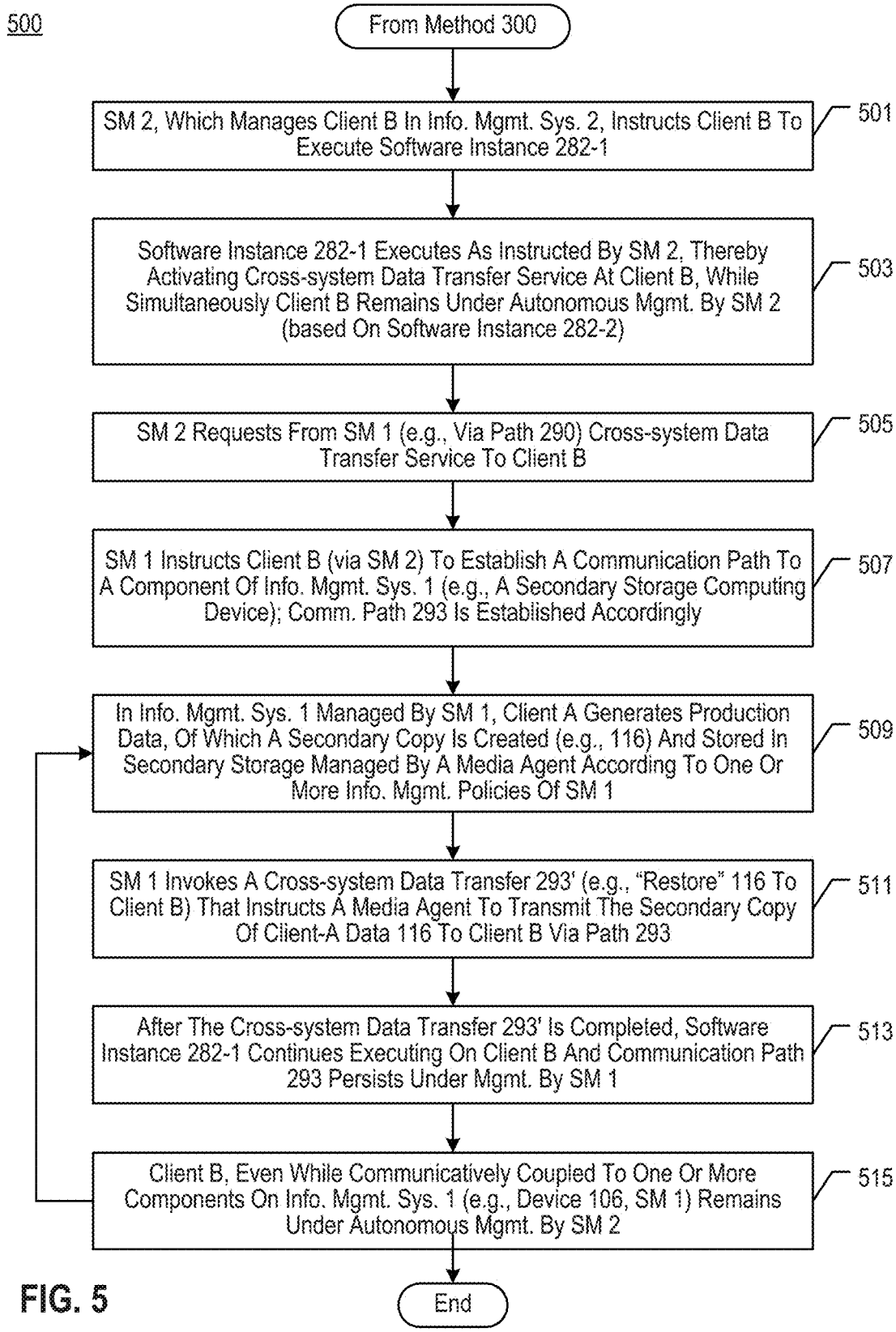
FIG. 5 depicts some salient operations of a method 500 according to an alternative illustrative embodiment of the present invention.

FIG. 5 depicts some salient operations of a method 500 according to an alternative illustrative embodiment of the present invention. Illustrative system 200 and relevant components thereof execute method 500 as described in further detail below. Control passes to method 500 from method 300. Based at least in part on the enabling operations of method 300, method 500 is at least in part directed at an alternative method of executing a cross-system data transfer.

At block 501, SM 2, which manages client B as a component of information management system 2, instructs client B (e.g., via path 292 to software instance 282-2) to begin executing the software instance 282-1 that relates to SM 1. This software instance was previously set up, but was not executing.

At block 503, which is analogous to block 407, Client B executes software instance 282-1 as instructed by SM 2 (e.g., sharing binaries 283).

At block 505, SM 2 requests from SM 1 (e.g., via path 290) a cross-system data transfer to one of its local clients, e.g., to client B. The request may (i) comprise a query about what source data (primary, secondary and/or tertiary) is available in information management system 1, (ii) comprise a query about which clients operate in information management system 1, and/or (iii) identify a particular client in information management system 1 as the source of data to be transferred to information management system 2, e.g., client A.

At block 507, SM 1 instructs client B (e.g., indirectly via path 290' comprising SM 2) to establish a communication path to, or to accept a communication initiated by, a component of information management system 1. Illustratively, SM 1 instructs client B to communicatively couple to a secondary storage computing device comprising a certain media agent, e.g., device 106 comprising media agent 144. Client B complies and/or responds and communication path 293 is established accordingly.

At block 509, which is analogous to block 401, client A generates production data.

At block 511, which is analogous to block 411, SM 1 invokes a cross-system data transfer operation, instructing that the secondary copy of client-A data 116 is to be transmitted by media agent 144 to client B. The operation may be on demand and/or scheduled and/or a combination, without limitation. A secondary copy of client A-data 116 is transferred accordingly to client B (e.g., via path 293), thus completing the cross-system data transfer 293'.

At block 513, after the cross-system data transfer 293' is completed, client B continues to execute software instance 282-1 that relates to SM 1. In some embodiments, communication path 293 and/or communication path 290' persists under the management of SM 1. In some embodiments, one or more of the communication paths to components of information management system 1 are torn down, and may be re-established under the management of SM 1.

At block 515, client B, even while communicatively coupled to one or more components of information management system 1 (e.g., media agent 144, device 106, SM 1) remains under autonomous management by SM 2 as a component of information management system 2 (e.g., via path 292 to software instance 282-2). Accordingly, Client B may be generating data, transmitting data, receiving data, communicating with SM 2 and/or with other components of information management system 2 throughout the duration of methods 300, 400, and/or 500. Information management operations involving client B may execute accordingly within information management system 2, e.g., backup, restore, etc. Method 500 may loop back to block 509.

In regard to methods 300, 400, and 500, other embodiments are possible within the scope of the present invention, such that the above-recited operations are differently sequenced, sub-divided, organized, and/or combined. In some embodiments, a different component may initiate or execute a given operation. Other embodiments may incorporate one or more operations from methods 300, 400, and/or 500 while remaining within the scope of the present invention.

A method according to an illustrative embodiment may comprise:
  in a first information management system, managing by a first storage manager:
    (i) a first client computing device as a component of the first information management system and
    (ii) a secondary copy of data generated by the first client computing device;
  instructing, by the first storage manager, a secondary storage computing device in the first information management system,
    wherein the secondary storage computing device is associated with the secondary copy of data to communicatively couple to a second client computing device in a second information management system,
    wherein a second storage manager autonomously manages the second information management system including the second client computing device, and
    wherein the second storage manager, the second information management system, and the second client computing device are physically and logically separate from the respective first storage manager, the first information management system, and the first client computing device;
  managing, by the first storage manager, a cross-system data transfer operation to transmit the secondary copy of data generated by the first client computing device to the second client computing device in the second information management system;
  transmitting the secondary copy of data generated by the first client computing device, according to the cross-system data transfer operation, by the secondary storage computing device in the first information management system to the second client computing device in the second information management system; and
  wherein, while communicatively coupled to the secondary storage computing device in the first information management system, the second client computing device remains under autonomous management by the second storage manager as a component of the second information management system.

The method may further comprise: instructing the second client computing device, by the first storage manager, to communicatively decouple from the secondary storage computing device in the first information management system, while simultaneously the second client computing device remains under autonomous management by the second storage manager as a component of the second information management system. The method may further comprise: instructing the secondary storage computing device, by the first storage manager, to communicatively decouple from the second client computing device, while simultaneously the second client computing device remains under autonomous management by the second storage manager as a component of the second information management system. Further, the method wherein the cross-system data transfer operation to transmit the secondary copy of data generated by the first client computing device to the second client computing device in the second information management system is based at least in part on information about the second client computing device received by the first storage manager from the second storage manager, wherein the information is insufficient for the first storage manager to manage the second client computing device as a component of the first information management system, and further wherein the second client computing device remains under autonomous management by the second storage manager as a component of the second information management system.

A system according to an illustrative embodiment may comprise:
  at least one processor;
  in a second information management system managed by a second storage manager, means for managing, by the second storage manager, a second client computing device as a component of the second information management system,
    wherein the means for managing is based at least in part on a second instance of an information management software that executes on the client computing device;
  means for executing, by the second client computing device in response to instructions from the second storage manager, a second instance of the information management software;
  means for transmitting information about the second client computing device, by the second storage manager to a first storage manager that manages a first information management system, wherein the information is sufficient for a cross-system data transfer operation to be managed by the first storage manager and wherein the information is also insufficient for the first storage manager to manage the client computing device as a component of the first information management system; and means for establishing a communication path between the second client computing device in the second information management system and the first storage manager, wherein the communication path is based at least in part on:
(i) the executing of the second instance of the information management software by the second client computing device and
(ii) the information about the second client computing device,
wherein the client computing device remains under autonomous management by the second storage manager as a component of the second information management system.

The system may further comprise: means for requesting, by the second storage manager from the first storage manager, the cross-system data transfer of a secondary copy of data generated by a first client computing device in the first information management system to the second client computing device in the second information management system. The system may further comprise: means for receiving a secondary copy of data generated in the first information management system by the second client computing device in the second information management system and from a component of the first information management system, wherein while receiving, the client computing device remains under autonomous management by the second storage manager as a component of the second information management system. The system further wherein the first instance of the information management software shares a set of binary files that are used by the second instance.

According to an illustrative embodiment, a computer-readable medium, excluding transitory propagating signals, storing instructions that, when executed by at least one computing device, cause the computing device to perform operations, may comprise:

in a first information management system, managing by a first storage manager: (i) a first client computing device as a component of the first information management system and (ii) a secondary copy of data generated by the first client computing device;

instructing, by the first storage manager, a second client computing device in a second information management system to communicatively couple to a secondary storage computing device in the first information management system, wherein the secondary storage computing device is associated with the secondary copy of data generated by the first client computing device;

managing, by the first storage manager, a cross-system data transfer operation to transmit the secondary copy of data generated by the first client computing device to the second client computing device in the second information management system;

transmitting the secondary copy of data generated by the first client computing device, according to the cross-system data transfer operation, by the secondary storage computing device in the first information management system to the second client computing device in the second information management system; and wherein, while communicatively coupled to the secondary storage computing device in the first information management system, the second client computing device remains under autonomous management by the second storage manager as a component of the second information management system.

The computer-readable medium further wherein the managing by the first storage manager is based at least in part on an indirect communication path between the first storage manager and the second client computing device, wherein the communication path comprises the second storage manager. The computer-readable medium further wherein the communication path is further based at least in part on information about the second client computing device received by the first storage manager from the second storage manager, wherein the information is insufficient for the first storage manager to manage the second client computing device as a component of the first information management system, and further wherein the second client computing device remains under autonomous management by the second storage manager as a component of the second information management system.

According to an illustrative embodiment, a method may comprise:

in a second information management system managed by a second storage manager, managing, by the second storage manager, a client computing device as a component of the second information management system, wherein the managing is based at least in part on a second instance of an information management software that executes on the client computing device;

instructing, by the second storage manager, the client computing device to execute a first instance of the information management software such that the first instance and the second instance are based on a set of binary files stored on the client computing device; and wherein, based on executing the first instance of the information management software: (i) the client computing device communicatively couples to a component of a first information management system for a cross-system data transfer operation, wherein a first storage manager manages the first information management system, (ii) but the client computing device is not managed by the first storage manager as a component of the first information management system, (iii) while simultaneously the client computing device remains under autonomous management by the second storage manager as a component of the second information management system.

The method may further comprise: instructing the client computing device, by the second storage manager, to stop executing the first instance of the information management software, causing the client computing device to communicatively decouple from the first storage manager, while simultaneously the client computing device remains under autonomous management by the second storage manager as a component of the second information management system. The method may further comprise: based on executing the first instance of the information management software, receiving data, by the client computing device from a component of the first information management system that is managed by the first storage manager, wherein the received data is a secondary copy of data of another client computing device in the first information management system. The method wherein the receiving of the data from the component of the first information management system results from a cross-system data transfer operation managed by the first storage manager. The method wherein the cross-system data transfer is invoked by the first storage manager. The method wherein the cross-system data transfer is invoked by the first storage manager as a restore operation. The method wherein the cross-system data transfer is invoked by the second storage manager. The method wherein the cross-system data transfer is invoked by the second storage manager as a restore operation. The method wherein the secondary copy of data in the first information management system is requested by the second storage manager from the first storage manager.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising:
    by a first computing device, using shared binaries to instantiate (i) a first executable version of an information management software, and (ii) a second executable version of the information management software;
    by the first computing device, executing (a) the first executable version of the information management software for operating in a first information management system, and (b) the second executable version of the information management software for operating in a second information management system,
        wherein according to at least one storage policy in the second information management system, secondary copies of data generated by the first computing device are created using the second executable version of the information management software, and
        wherein in the first information management system no storage policies govern the data generated by the first computing device;
    by a first storage manager in the first information management system, causing a secondary copy of data that was generated in the first information management system to be restored to the first computing device executing the first executable version of the information management software, and
        wherein the first storage manager receives information about the first computing device from a second storage manager in the second information management system,
        wherein after the secondary copy of data that was generated in the first information management system has been restored to the first computing device, data restored to the first computing device is made part of the second information management system; and
    wherein the second storage manager is hosted by a second computing device and wherein the first storage manager is hosted by a third computing device.

2. The method of claim 1, wherein a media agent in the first information management system restores the secondary copy of data that was generated in the first information management system, and wherein the media agent is hosted by a fourth computing device.

3. The method of claim 1, wherein the information management software is a data agent.

4. The method of claim 1, wherein when using the first executable version of the information management software, the first computing device is limited to receiving data from the first information management system, but the data generated by the first computing device is not accessible to the first information management system.

5. The method of claim 1 further comprising: after the secondary copy of data that was generated in the first information management system has been restored to the first computing device, communicatively decoupling the first computing device from the first information management system.

6. The method of claim 5, wherein the communicatively decoupling of the first computing device from the first information management system is caused by at least one of: the first storage manager, and the second storage manager.

7. The method of claim 1, wherein when using the second executable version of the information management software, the first computing device operates as a client of the second information management system.

8. The method of claim 1, wherein when using the first executable version of the information management software, the first computing device operates as a recipient of data transferred from the first information management system and not as a client of the first information management system.

9. The method of claim 1, wherein the information about the first computing device received from the second storage manager is in response to the first storage manager requesting to restore the secondary copy of data from the first information management system to the first computing device.

10. The method of claim 1, wherein the information about the first computing device received from the second storage manager comprises registry-only information that is sufficient for a transfer of the secondary copy of data but insufficient for the first computing device to operate as a client of the first information management system.

11. The method of claim 1, wherein after the secondary copy of data that was generated in the first information management system has been restored to the first computing device, the first computing device stops executing the first executable version of the information management software.

12. The method of claim 1, wherein at least one of the first storage manager and the second storage manager causes the first computing device to stop executing the first executable version of the information management software after the secondary copy of data that was generated in the first information management system has been restored to the first computing device.

13. A non-transitory computer-readable medium storing instructions that, when executed by a first computing device comprising one or more hardware processors, cause the first computing device to perform operations comprising:
    use shared binaries to instantiate (i) a first executable version of an information management software, and (ii) a second executable version of the information management software;
    execute (a) the first executable version of the information management software for operating in a first information management system, and (b) the second executable version of the information management software for operating in a second information management system,
wherein the second executable version of the information management software is for creating secondary copies of data generated by the first computing device based on at least one storage policy configured in the second information management system, and
wherein no storage policies for the data generated by the first computing device are configured in the first information management system;
while executing the first executable version of the information management software, restore to the first computing device from the first information management system a secondary copy of data created in the first information management system,
wherein data restored to the first computing device is made part of the second information management system, and
wherein a first storage manager in the first information management system receives information about the first computing device from a second storage manager in the second information management system; and
wherein the second storage manager is hosted by a second computing device and wherein the first storage manager is hosted by a third computing device.

14. The non-transitory computer-readable medium of claim 13, wherein the operations further comprise: stop executing the first executable version of the information management software after the secondary copy of data has been restored.

15. The non-transitory computer-readable medium of claim 13, wherein when using the second executable version of the information management software, the first computing device operates as a client of the second information management system, and
wherein when using the first executable version of the information management software, the first computing device operates as a restore destination in the first information management system and not as a client of the first information management system.

16. The non-transitory computer-readable medium of claim 13, wherein when using the first executable version of the information management software, the first computing device is limited to receiving data restored from the first information management system, but the data generated by the first computing device is not accessible to the first information management system.

17. The non-transitory computer-readable medium of claim 13, wherein the information management software is a data agent.

18. The non-transitory computer-readable medium of claim 13, wherein the operations further comprise: after the secondary copy of data that was generated in the first information management system has been restored to the first computing device, communicatively decoupling the first computing device from the first information management system.

19. The non-transitory computer-readable medium of claim 13, wherein the information about the first computing device received from the second storage manager comprises registry-only information that is sufficient to restore the secondary copy of data but insufficient for the first computing device to operate as a client of the first information management system.

20. The non-transitory computer-readable medium of claim 13, wherein the information about the first computing device received from the second storage manager is in response to the first storage manager requesting to restore the secondary copy of data from the first information management system to the first computing device.

* * * * *